United States Patent
Khandekar et al.

(10) Patent No.: US 8,396,013 B2
(45) Date of Patent: Mar. 12, 2013

(54) METHOD AND APPARATUS FOR SUPPORTING HALF-DUPLEX TERMINALS IN AN ASYNCHRONOUS MODE

(75) Inventors: Aamod Khandekar, San Diego, CA (US); Alexei Gorokhov, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1185 days.

(21) Appl. No.: 11/848,842

(22) Filed: Sep. 6, 2007

(65) Prior Publication Data

US 2008/0130529 A1     Jun. 5, 2008

Related U.S. Application Data

(60) Provisional application No. 60/843,892, filed on Sep. 11, 2006.

(51) Int. Cl.
*H04B 1/56* (2006.01)
(52) U.S. Cl. .......................................... 370/276; 370/375
(58) Field of Classification Search .................... 370/276
See application file for complete search history.

(56) References Cited

U.S. PATENT DOCUMENTS

| | | | |
|---|---|---|---|
| 5,442,635 A | 8/1995 | Persson | |
| 5,945,944 A * | 8/1999 | Krasner | 342/357.06 |
| 6,327,254 B1 | 12/2001 | Chuah | |
| 6,611,507 B1 * | 8/2003 | Hottinen et al. | 370/331 |
| 7,006,477 B1 | 2/2006 | Balachandran et al. | |
| 7,197,022 B2 * | 3/2007 | Stanwood et al. | 370/337 |
| 7,339,926 B2 * | 3/2008 | Stanwood et al. | 370/375 |
| 2002/0118666 A1 | 8/2002 | Stanwood | |
| 2002/0122395 A1 * | 9/2002 | Bourlas et al. | 370/329 |
| 2005/0032542 A1 | 2/2005 | Wilborn et al. | |
| 2006/0291430 A1 * | 12/2006 | Putzolu et al. | 370/335 |
| 2007/0140178 A1 * | 6/2007 | Jung et al. | 370/335 |

FOREIGN PATENT DOCUMENTS

| | | |
|---|---|---|
| CN | 1631012 A | 6/2005 |
| JP | 11298533 A | 10/1999 |
| JP | 2000078661 A | 3/2000 |
| JP | 2001507896 A | 6/2001 |
| JP | 2001204067 A | 7/2001 |

(Continued)

OTHER PUBLICATIONS

Sater G et al: "Media Access Control Layer proposal for the 802.16.1 Air Interface Specification" IEEE 802.16.1MC-00/21R1, XX, XX, Jul. 7, 2000, pp. 1-14, XP002210334.
International Search Report—PCT/US07/077505, International Search Authority, European Patent Office—Mar. 14, 2008.

(Continued)

*Primary Examiner* — Kibrom T Hailu
(74) *Attorney, Agent, or Firm* — Charles E. Eggers

(57) ABSTRACT

Systems and methodologies are described that provide support for signal acquisition in wireless communication systems that utilize half-duplex communication in the presence of asynchronous sectors. Forward link and reverse link superframes can be structured such that a given frame position in a superframe alternates between forward link communication and reverse link communication for a particular half-duplex interlace. More particularly, an odd number of frames can be grouped into respective forward link and reverse link superframes, from which frames can be assigned to a first half-duplex interlace and a second half-duplex interlace in an alternating fashion. By varying the communication link used by a half-duplex interlace at a given frame location, terminals operating on a single half-duplex interlace can detect asynchronously operating sectors irrespective of the transmission timeline of such sectors.

41 Claims, 14 Drawing Sheets

FOREIGN PATENT DOCUMENTS

| | | |
|---|---|---|
| JP | 2002505054 A | 2/2002 |
| JP | 2002517942 A | 6/2002 |
| JP | 2008526135 | 7/2008 |
| RU | 2178953 C2 | 1/2002 |
| TW | 200623819 | 7/2006 |
| WO | WO9859441 A2 | 12/1998 |
| WO | WO9963686 A1 | 12/1999 |
| WO | WO0036208 A1 | 6/2000 |
| WO | WO2006072086 | 7/2006 |

OTHER PUBLICATIONS

International Preliminary Report on Patentability, PCT/US2007/077505—The International Bureau of WIPO—Geneva, Switzerland, Mar. 17, 2009.

Written Opinion—PCT/US07/077505, International Searching Authority—European Patent Office, Mar. 14, 2008.

Taiwan Search Report—TW096133918—TIPO—Jun. 28, 2011.

* cited by examiner

METHOD AND APPARATUS FOR SUPPORTING HALF-DUPLEX TERMINALS IN AN ASYNCHRONOUS MODE

CROSS-REFERENCE

This application claims the benefit of U.S. Provisional Application Ser. No. 60/843,892, filed Sep. 11, 2006, and entitled "A METHOD AND APPARATUS FOR SUPPORTING HALF DUPLEX TERMINALS IN AN ASYNCHRONOUS MODE," the entirety of which is incorporated herein by reference.

BACKGROUND

I. Field

The present disclosure relates generally to wireless communications, and more specifically to techniques for signal acquisition and transmission in a wireless communication system.

II. Background

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Wireless communication systems often utilize frequency division duplexing (FDD) for data transmission between base stations and wireless terminals on the forward and reverse links, wherein separate channels are used for the forward and reverse links such that a wireless terminal may simultaneously receive data on a forward link (FL) channel and transmit data on a reverse link (RL) channel. The forward link (or "downlink") refers to the communication link from the base stations to one or more terminals, while the reverse link (or "uplink") refers to the communication link from a terminal to one or more base stations.

Terminals designed for operation in a FDD system are able to receive and transmit at the same time by using a duplexer, which assigns FL communications and RL communications to different frequency bands to allow simultaneous FL and RL communication. To support terminals that are not capable of receiving and transmitting at the same time, a FDD system can additionally provide half-duplex communication by dividing frames on the forward and reverse links into half-duplex interlaces such that a base station and a terminal communicating on a half-duplex interlace can alternate between FL and RL transmission. Half-duplex interlaces are typically created by grouping forward and reverse link frames into superframes and dividing frames in each superframe among the half-duplex interlaces such that all interlaces are allocated an equal number of frames in each superframe and that a given frame position in a superframe always corresponds to a particular communication link (i.e., the forward link or the reverse link) for a given interlace.

A terminal in a wireless communication system may not know which base stations, if any, near its vicinity are transmitting. Furthermore, in a system where base stations operate asynchronously, the terminal may not know the timing information necessary for communication with a particular base station. Thus, a terminal can perform signal acquisition on the forward link to detect for transmissions from base stations in the system and to synchronize to the timing and frequency of each detected base stations of interest. A base station can transmit acquisition pilots or other signals to aid in signal acquisition and allow a terminal to detect the base station. However, in a FDD system utilizing half-duplex communication where base stations operate asynchronously, some or all of the acquisition pilots transmitted by a base station may be transmitted exclusively during RL transmissions of a terminal operating on a single half-duplex interlace. As a result, terminals operating on a single-half duplex interlace may not be able to detect asynchronous base stations in the system, which can result in a decrease in system efficiency.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

The described embodiments mitigate the above-mentioned problems by providing support for signal acquisition in FDD systems that utilize half-duplex communication and asynchronously operating base stations. More particularly, interlaced forward link and reverse link superframes can be structured such that a given frame position in a superframe alternates between forward link communication and reverse link communication for a particular half-duplex interlace. In one example described herein, this can be achieved by grouping an odd number of frames into respective forward link and reverse link superframes and assigning frames in the forward link and reverse link superframes to a first half-duplex interlace and a second half-duplex interlace in an alternating fashion. By varying the communication link used by a half-duplex interlace at a given frame location, terminals operating on a single half-duplex interlace can detect acquisition signals from asynchronously operating base stations irrespective of the time at which the acquisition signals are transmitted.

According to an aspect, a method for providing half-duplex communication in the presence of asynchronous sectors in a wireless communication system is described herein. The method can comprise partitioning transmission timelines on a forward link and a reverse link into superframes having a uniform odd number of frames. Further, the method can include assigning respective frames in superframes on the forward link and the reverse link to one of a first half-duplex interlace and a second half-duplex interlace. The method can also include associating a terminal with one or more half-duplex interlaces. In addition, the method can include communicating with the terminal using frames assigned to the one or more half-duplex interlaces associated with the terminal.

Another aspect relates to a wireless communications apparatus that can include a memory that stores data relating to a first half-duplex interlace and a second half-duplex interlace, the first half-duplex interlace and second-half duplex interlace having frames allocated among respective superframes on a forward link and a reverse link having a predetermined odd number of frames such that frames on the forward link and reverse link are staggered between the first half-duplex interlace and the second half-duplex interlace. The wireless communications apparatus can also include a processor configured to associate an access terminal with a half-duplex interlace and to communicate with the access terminal using frames of the associated half-duplex interlace.

Yet another aspect relates to an apparatus that facilitates half-duplex communication in an asynchronously operating wireless communication system. The apparatus can include means for dividing frames for a forward link and a reverse link provided by a set of superframes between a first half-duplex interlace and a second half-duplex interlace such that a given frame position in a superframe alternates between forward link communication and reverse link communication for a given half-duplex interlace. The apparatus can additionally comprise means for determining one or more half-duplex interlaces for communication with a wireless terminal.

Still another aspect relates to a computer-readable medium that can comprise code for causing a computer to divide transmission timelines for a forward link and a reverse link into superframes having a constant odd number of frames. Further, the computer-readable medium can include code for causing a computer to assign frames in respective superframes to one of a plurality of half-duplex interlaces such that frames are staggered between the half-duplex interlaces.

In accordance with another aspect, an integrated circuit is described herein that can execute computer-executable instructions for supporting half-duplex communication in a wireless communication system in the presence of asynchronous access points. These instructions can comprise partitioning a transmission timeline for a forward link into respective superframes having a superframe preamble and a uniform odd number of frames. Further, the instructions can include partitioning a transmission timeline for a reverse link into respective superframes having a uniform odd number of frames. In addition, the instructions can include allocating respective frames in the superframes on the forward link and the reverse link to one of a first half-duplex interlace and a second half-duplex interlace.

In accordance with yet another aspect, a method of half-duplex communication with asynchronously operating sectors in a wireless communication system is described herein. The method can include associating with one or more of a first half-duplex interlace and a second half-duplex interlace for communication with a first sector on respective superframes for a forward link and a reverse link having a uniform odd number of frames, the first half-duplex interlace and the second half-duplex interlace are assigned to non-overlapping frames in the respective superframes. Further, the method can comprise communicating with the first sector at frames of the one or more associated half-duplex interlaces. In addition, the method can include attempting to detect a second sector on the forward link at frames of the one or more associated half-duplex interlaces.

Another aspect relates to a wireless communications apparatus that can include a memory that stores data relating to a half-duplex interlace for communication with a first access point on respective superframes for a forward link and a reverse link having a predetermined odd number of frames and non-overlapping frames in the respective superframes allocated to the half-duplex interlace. The wireless communications apparatus can additionally include a processor configured to communicate with the first access point using the frames allocated to the half-duplex interlace and to detect one or more acquisition pilots from a second access point on the forward link using the frames allocated to the half-duplex interlace.

Yet another aspect relates to an apparatus that facilitates half-duplex communication in a wireless communication system in the presence of asynchronous base stations. The apparatus can include means for associating with a half-duplex interlace chosen from a plurality of half-duplex interlaces for communication with a serving base station, each half-duplex interlace including frames for a forward link and a reverse link allocated from respective superframes comprising a predetermined odd number of frames. The apparatus can additionally include means for communicating with the serving base station using frames of the associated half-duplex interlace. Further, the apparatus can comprise means for detecting information transmitted from an asynchronous base station using frames of the associated half-duplex interlace for the forward link.

Still another aspect relates to a computer-readable medium that can comprise code for causing a computer to establish communication with a first sector in the wireless communication system. Further, the computer-readable medium can include code for causing a computer to receive an assignment for a half-duplex interlace for communication with the first sector chosen from a first half-duplex interlace and a second half-duplex interlace, the assigned half-duplex interlace includes frames for a forward link and a reverse link allocated from respective superframes comprising a constant odd number of frames. The computer-readable medium can additionally include code for causing a computer to communicate with the first sector using frames of the assigned half-duplex interlace. Moreover, the computer-readable medium can include code for causing a computer to attempt to detect a second sector on the forward link using frames of the associated half-duplex interlace at least in part by searching for one or more acquisition pilots transmitted by the second sector.

An additional aspect relates to an integrated circuit that executes computer-executable instructions for half-duplex communication in the presence of asynchronous sectors in a wireless communication system. These instructions can include associating with one or more of a first half-duplex interlace and a second half-duplex interlace for communication with a first sector, the first half-duplex interlace and the second half-duplex interlace contain frames for a forward link and a reverse link provided by a set of superframes divided such that a given frame position in a superframe alternates between forward link communication and reverse link communication for a given half-duplex interlace. In addition, the instructions can comprise communicating with the first sector on one or more of the forward link and the reverse link using frames of the one or more associated half-duplex interlaces. Further, the instructions can include searching for acquisition pilots transmitted by a second sector on the forward link using frames of the one or more associated half-duplex interlaces.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

DETAILED DESCRIPTION

Figure 1:
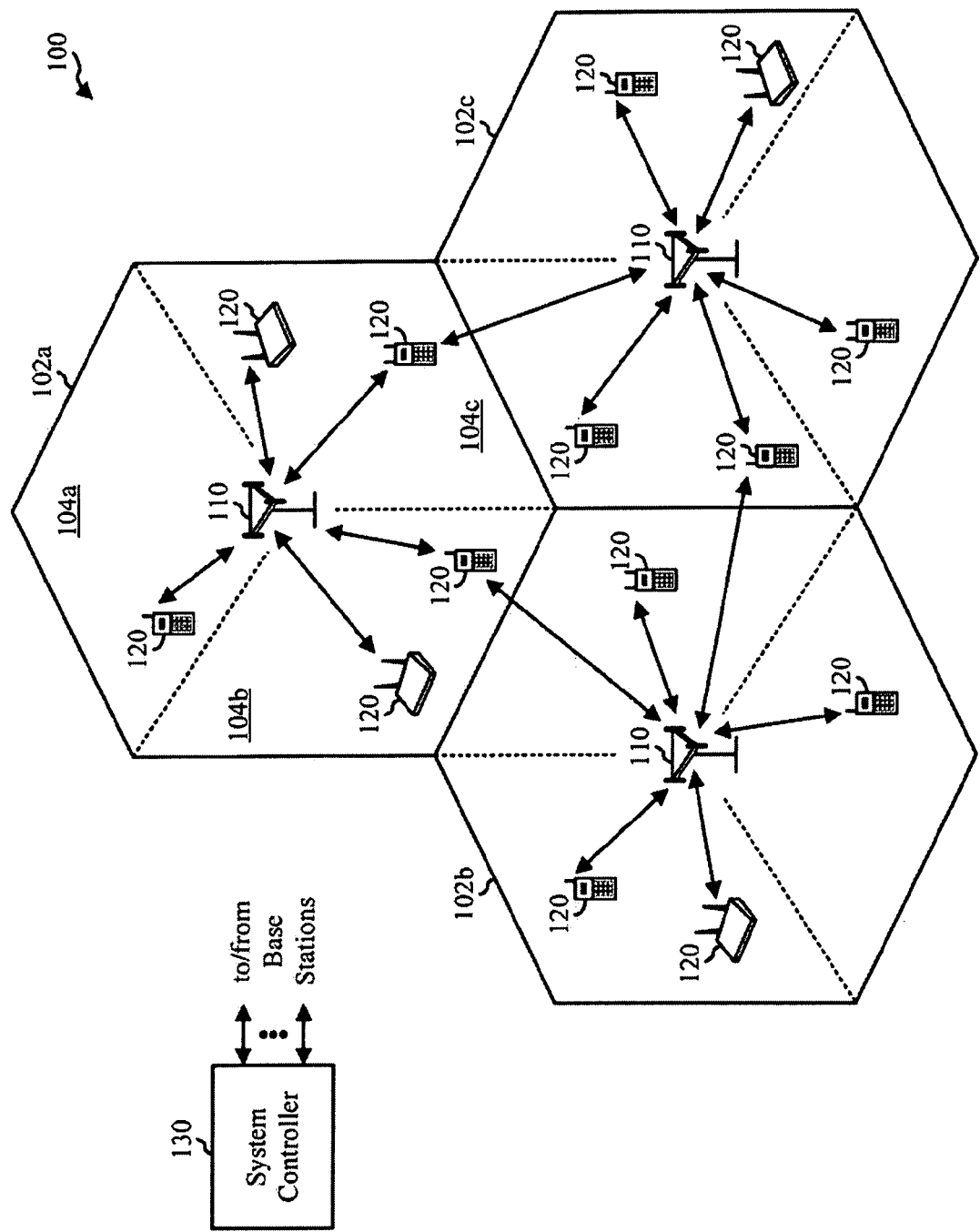
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 may be an access point, a Node B, and/or another appropriate network entity. Each base station 110 provides communication coverage for a particular geographic area 102. As used herein and generally in the art, the term "cell" can refer to a base station 110 and/or its coverage area 102 depending on the context in which the term is used. To improve system capacity, the coverage area 102 corresponding to a base station 110 may be partitioned into multiple smaller areas (e.g., areas 104a, 104b, and 104c). Each of the smaller areas 104a, 104b, and 104c may be served by a respective base transceiver subsystem (BTS, not shown). As used herein and generally in the art, the term "sector" can refer to a BTS and/or its coverage area depending on the context in which the term is used. In a cell 102 having multiple sectors 104, the BTSs for all sectors 104 of the cell 102 can be co-located within the base station 110 for the cell 102.

In another example, the system 100 can utilize a centralized architecture by employing a system controller 130 that can be coupled to one or more base stations 110 and provide coordination and control for the base stations 110. In accordance with alternative aspects, system controller 130 may be a single network entity or a collection of network entities. Additionally, the system 100 may utilize a distributed architecture to allow the base stations 110 to communicate with each other as needed.

In accordance with one aspect, terminals 120 may be dispersed throughout the system 100. Each terminal 120 may be stationary or mobile. By way of non-limiting example, a terminal 120 may be an access terminal (AT), a mobile station, user equipment, a subscriber station, and/or another appropriate network entity. A terminal may be a wireless device, a cellular phone, a personal digital assistant (PDA), a wireless modem, a handheld device, and so on.

In accordance with another aspect, system 100 may utilize FDD and support simultaneous transmission on a forward link (FL) and a reverse link (RL) via two separate frequency channels. In addition, system 100 may support full-duplex communication for terminals 120 that are capable of full-duplex operation ("full-duplex terminals"). As used herein and generally in the art, full-duplex refers to a mode in which a station (e.g., a base station 110 or a terminal 120) may simultaneously transmit and receive at the same time. In one example, a station capable of full-duplex operation may be equipped with a single antenna for both transmission and reception. Thus, the station can have a duplexer, which can route a received signal from the antenna to a receiver for data reception and route a modulated signal from a transmitter to the antenna for data transmission.

Additionally, system 100 may also support half-duplex communication for terminals 120 not capable of full-duplex operation ("half-duplex terminals"). As used herein and generally in the art, half-duplex refers to a mode in which a station may either transmit or receive at any given moment but may not simultaneously transmit and receive. In one example, a station capable only of half-duplex operation may be equipped with a single antenna for both transmission and reception. Thus, the station may have a switch that can connect the antenna to a receiver during periods of data reception and connect a transmitter to the antenna during periods of data transmission.

In another example, system 100 may utilize one or more multiple-access schemes, such as CDMA, TDMA, FDMA, OFDMA, Single-Carrier FDMA (SC-FDMA), and/or other suitable multiple-access schemes. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which may be modulated with data. Typically, modulation symbols are sent in the frequency domain with OFDM and in the time domain with SC-FDM. Additionally, system 100 may utilize a combination of multiple-access schemes, such as OFDMA and CDMA. Additionally, system 100 may utilize various framing structures to indicate the manner in which data and signaling are sent on the forward and reverse links. For clarity, non-limiting examples of framing structures that system 100 may utilize are described in more detail herein.

Figure 2:
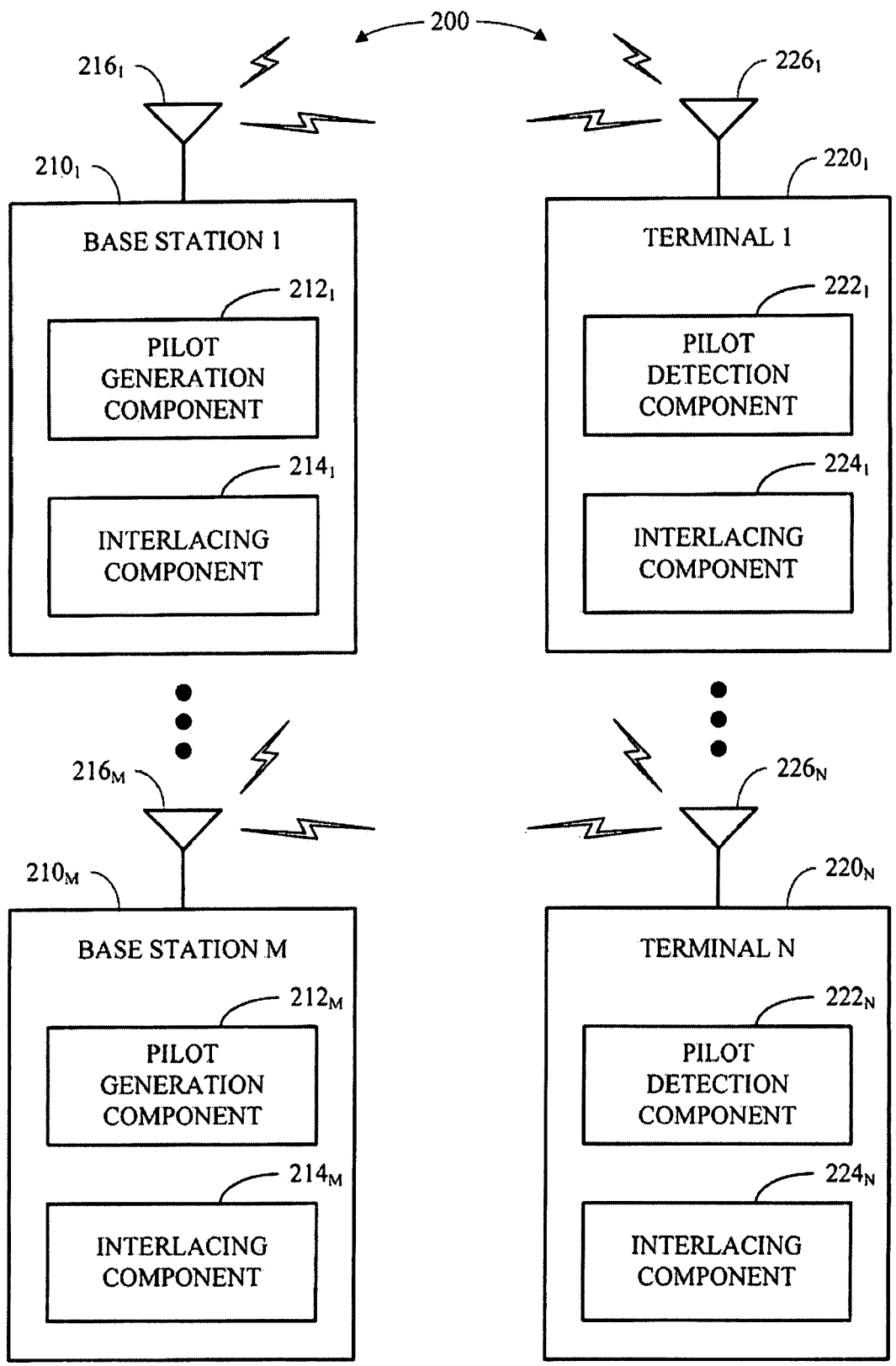
FIG. 2 is a block diagram of a system that facilitates half-duplex communication in a wireless communication system operating in an asynchronous mode in accordance with various aspects.

FIG. 2 is a block diagram of a system 200 that facilitates half-duplex communication in a wireless communication system operating in an asynchronous mode in accordance with various aspects described herein. In one example, system 200 includes one or more base stations 210 and one or more terminals 220. In accordance with one aspect, base stations 210 and terminals 220 can communicate on a forward link (FL) and a reverse link (RL) via antennas 216 at base stations 210 and antennas 226 at terminals 220. Although only one antenna 216 is illustrated at each base station 210 and only one antenna 226 is illustrated at each terminal 220 in system 200, it should be appreciated that base stations 210 and/or terminals 220 can have a plurality of antennas 216 and/or 226 for communicating with multiple base stations 210 and/or terminals 220 in system 200 as well as other suitable network entities (e.g., system controllers 130).

In accordance with one aspect, a base station 210 can generate and transmit information necessary to establish communication with a terminal 220 in system 200 by utilizing a pilot generation component 212. The information can then be received and utilized by the terminal 220 by using a pilot detection component 222 to undergo a signal acquisition process. By way of example, information generated by a pilot generation component 212 and processed by a pilot detection component 222 can relate to timing and synchronization information for system 200, timing and synchronization information for a base station 210 associated with the pilot generation component 212, the identity of a base station 210 associated with the pilot generation component 212, overhead information relating to system 200, and/or other appropriate information. In one specific, non-limiting example, one or more base stations 210 in system 200 can include multiple antenna groups (not shown), each of which can serve an individual coverage area (e.g., a sector 104) and can include an individual pilot generation component 212 for establishing communication with one or more terminals 220.

In one example, a pilot generation component 212 at a base station 210 can provide information required to establish communication with a terminal 220 in one or more acquisition pilots and/or other signals. By way of non-limiting example, these signals can include one or more time domain pilots such as time division multiplexed (TDM) pilots. Upon receiving these signals, a pilot detection component 222 at a terminal 220 can correlate with respect to the acquisition pilots and/or other signals to establish communication with the base station 210 that sent the signals. Correlation performed by a pilot detection component 222 at a terminal 220 can be, for example, a direct (e.g., real-time) correlation or a delayed correlation.

In accordance with another aspect, system 200 can utilize FDD communication. However, one or more terminals 220 may not be designed for operation in a system that utilizes FDD communication. For example, a terminal 220 may lack a duplexer or other means to allow the terminal 220 to transmit and receive simultaneously, as required in conventional FDD full-duplex communication. To allow these terminals 220 to function in system 200, base stations 210 may include interlacing components 214 that provide FDD half-duplex communication functionality by partitioning the FL and RL transmission timelines into multiple half-duplex interlaces. Further, one or more terminals 220 may also have an interlacing component 224.

In one example, interlacing components 214 and 224 can partition their respective FL and RL transmission timelines into superframes, each of which can be further divided into a superframe preamble and/or a predetermined number of physical layer frames (PHY frames, or simply "frames"). Alternatively, superframe structures for the FL and RL transmission timelines can be pre-configured by another network entity (e.g., a system controller 130). By way of example, each FL superframe can be configured to include a superframe preamble followed by a predetermined number of frames, and each RL superframe can be configured to include a predetermined number of frames that coincide with corresponding frames on the forward link. Frames can be configured to be adjacent in time, or alternatively a guard time can be applied between frames to prevent interference during a transition between communication links on a half-duplex interlace.

In another example, interlacing components 214 and 224 can divide the FL and RL transmission timelines among equal half-duplex interlaces. In one specific example, interlacing components 214 and/or 224 can divide the FL and RL transmission timelines among a first half-duplex interlace and a second-half duplex interlace by assigning frames to the interlaces in an alternating fashion on the forward and reverse links. After dividing the FL and RL transmission timelines into half-duplex interlaces, interlacing components 214 and 224 can associate terminals 220 to one or more of the interlaces. Assignment can be based on, for example, load balancing between interlaces, identifying information from terminals 220, and/or other suitable factors. Additionally, terminals 220 can additionally be associated with one or more interlaces based on communication capabilities of the terminals 220. For example, a terminal 220 capable of full-duplex operation in system 200 can be associated with all interlaces and allowed to communicate with a base station 210 on the forward and reverse links on any interlace.

In accordance with another aspect, pilot generation components 212 at respective base stations 210 can transmit signals necessary for signal acquisition by a pilot detection component 222 at a terminal 220 at a superframe preamble on the forward link. Alternatively, acquisition signals can be transmitted on one or more frames in the forward link. In one example, system 200 can be configured to operate asynchronously such that transmission timelines used by base stations 210 and/or antenna groups within base stations 210 are not required to align in time. However, such an asynchronous mode of operation for system 200 can conflict with the half-duplex operation supported by interlacing components 214 and 224. Specifically, because the transmission timelines of base stations 210 need not be aligned, a pilot generation component 214 within a base station 210 may be configured to always transmit acquisition signals at a point in time associated with the reverse link of a half-duplex terminal or another point in time when a half-duplex terminal associated with a particular interlace is unable to detect acquisition signals. As a result, one or more terminals 220 may be unable to detect when a base station 210 and/or antenna group within a base station 210 is transmitting acquisition signals and therefore may not be able to establish communication with that entity.

To mitigate the problems presented by the asynchronous mode of operation for system 200, interlacing components 214 and 224 can structure FL and RL superframes such that a given frame position in respective superframes for a given half-duplex interlace alternates between forward link communication and reverse link communication. By way of specific, non-limiting example, interlacing components 214 and 224 can assign alternating frames in each FL and RL superframe among half-duplex interlaces such that an initial frame position in respective superframes alternates between forward link communication and reverse link communication for a given half-duplex interlace. In an additional specific, non-limiting example, interlacing components 214 and 224 can alternate an interlace assignment corresponding to a given frame position by grouping an odd number of frames in each FL and RL superframe and assigning frames within the superframes among half-duplex interlaces in an alternating fashion. Such an assignment scheme allows a frame at a given frame position to alternate between FL and RL communication for a given half-duplex interlace by assigning the frames such that the interlaces have an uneven number of frames for each communication link in a superframe. By varying the communication link used by a half-duplex interlace at a given frame location, terminals 220 operating on a single half-duplex interlace can detect acquisition signals from asynchronously operating base stations 210 irrespective of the time at which the acquisition signals are transmitted. For example, if an asynchronous base station 210 transmits information at a time allocated for RL transmission for a terminal 220, interlacing components 214 and/or 224 at the base station 210 and/or terminal 220 can be configured such that the acquisition information will be transmitted in a following superframe at a time allocated for FL communication for the terminal 220 to allow the information to be detected by the terminal 220.

Figure 3:
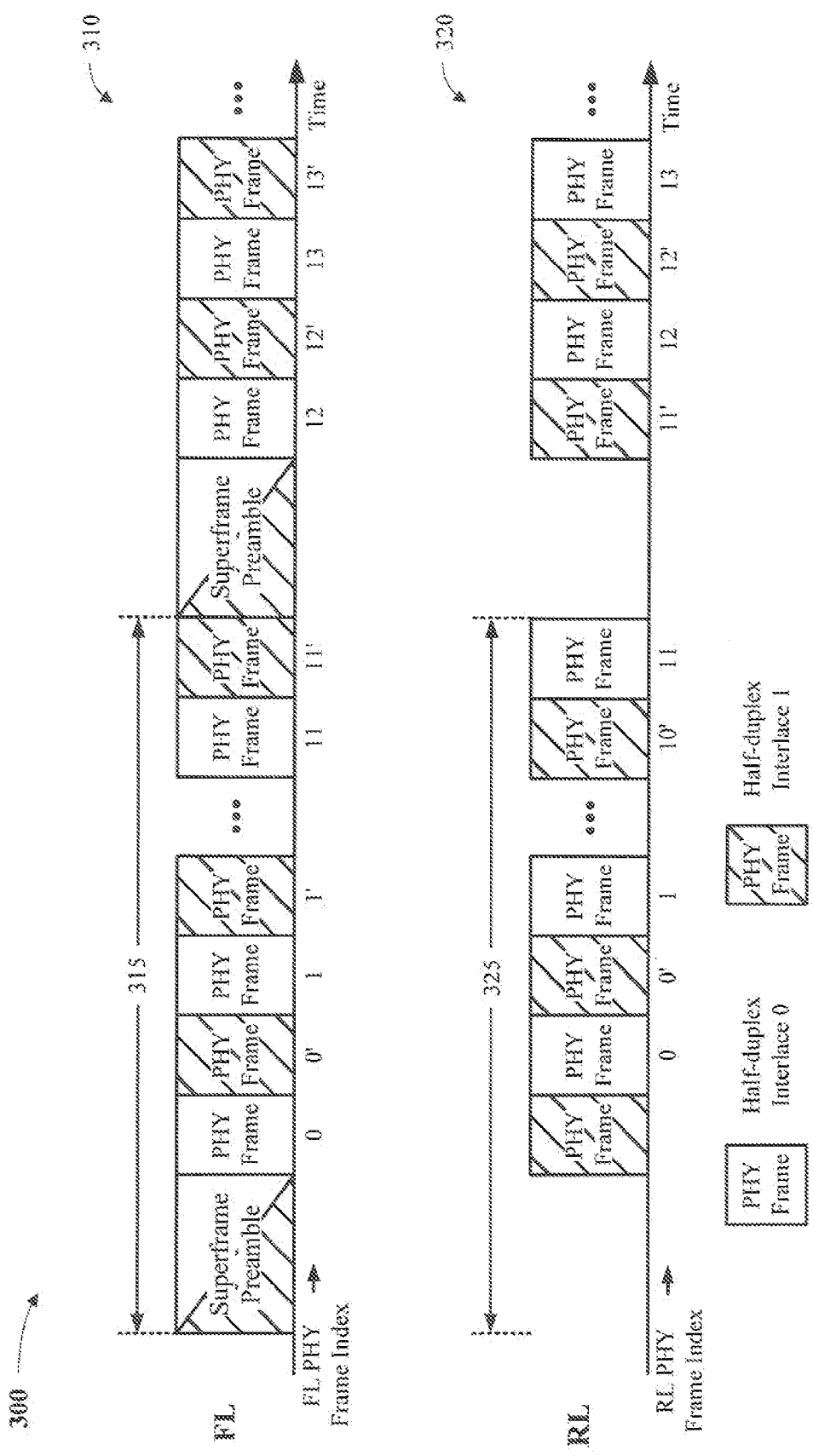
FIG. 3 illustrates an example FDD half-duplex superframe structure in accordance with various aspects.

FIG. 3 is a diagram illustrating an example FDD half-duplex superframe structure 300 in accordance with various aspects described herein. In one example, a forward link transmission timeline 310 and reverse link transmission timeline 320 can be partitioned into respective superframes 315 and 325. Each forward link superframe 315 can combine with a corresponding reverse link superframe 325 to occupy a preamble followed by a predetermined number of frames in time as shown by superframe structure 300. In the non-limiting example illustrated by superframe structure 300, forward link superframes 315 can include a preamble followed by 24 forward link frames, and corresponding reverse link superframes 325 can include 24 reverse link frames preceded by a time interval corresponding to the superframe preamble in forward link superframe 315.

In another example, two half-duplex interlaces, half-duplex interlace 0 and half-duplex interlace 1, can be defined. While the term "half-duplex interlace" is used in the present specification, it should be appreciated that this is merely one term that can be used and that any appropriate terminology may be used in connection with the aspects described herein. In one example, half-duplex interlace 0 can include every other forward link frame in respective forward link superframes 315 starting with the first forward link frame after the superframe preamble as well as every other reverse link frame in respective reverse link superframes 325 starting with the second reverse link frame in each superframe. In another example, half-duplex interlace 1 can include every other forward link frame in respective forward link superframes 315 starting with the second forward link frame after the superframe preamble and every other reverse link frame in respective reverse link superframes 325 starting with the first reverse link frame in each superframe. Thus, half-duplex interlace 1 can be complementary to half-duplex interlace 0. More particularly, half-duplex interlace 1 can include forward link and reverse link frames in place of reverse link and forward link frames respectively included in half-duplex interlace 0. In addition, both half-duplex interlaces can share a common superframe preamble. Each half-duplex interlace can also include temporally non-overlapping frames for the forward and reverse links, which means that the forward link frames do not overlap the reverse link frames in time.

While the above example describes a superframe structure 300 having two half-duplex interlaces, it should be appreciated that any number of half-duplex interlaces can be defined. Furthermore, the half-duplex interlaces may include the same number of forward link and reverse link frames staggered from one another, or the half-duplex interlaces may include different numbers of forward link and reverse link frames. Additionally, while the forward link and reverse link frames of each half-duplex interlace in superframe structure 500 abut one another, a guard time can also be provided between the forward link and reverse link frames of each half-duplex interlace in order to give a half-duplex terminal an amount of time to switch between transmitting and receiving or between receiving and transmitting.

In one example, the frames of half-duplex interlace 0 for each link are assigned sequentially increasing indices, as illustrated by forward link timeline 310 and reverse link timeline 320. Similarly, the frames of half-duplex interlace 1 for each link can also be assigned sequentially increasing indices using prime notation (e.g., 1', 2', . . . ), such that a forward link frame n' of half-duplex interlace 1 follows forward link frame n of half-duplex interlace 0 and a reverse link frame n' of half-duplex interlace 1 follows a reverse link frame n of half-duplex interlace 0.

Terminals (e.g., terminals 220) in a wireless communication system utilizing superframe structure 300 can access the system via one or more of the half-duplex interlaces in various ways. In one example, a terminal can randomly select one of the two half-duplex interlaces to access the system. In another example, a terminal can determine a half-duplex interlace that should be used for system access and access the system via the determined half-duplex interlace. Information regarding which half-duplex interlace to use for system access may be communicated to the terminal in a superframe preamble, known a priori by the terminal, or provided in some other manner. Additionally and/or alternatively, a base station (e.g., a base station 210) may determine the capability of a terminal and associate the terminal with one or more half-duplex interlaces accordingly.

In accordance with one aspect, data and signaling are exchanged between a base station and a half-duplex terminal in frames of a half-duplex interlace assigned to the terminal. On the forward link, a base station may transmit data and signaling (e.g., power control bits, erasure indicators, and so on) to the terminal only in forward link frames of the half-duplex interlace assigned to the terminal. On the reverse link, the terminal may transmit data and signaling to the base station only in reverse link frames of the half-duplex interlace assigned to the terminal.

Figure 4A:
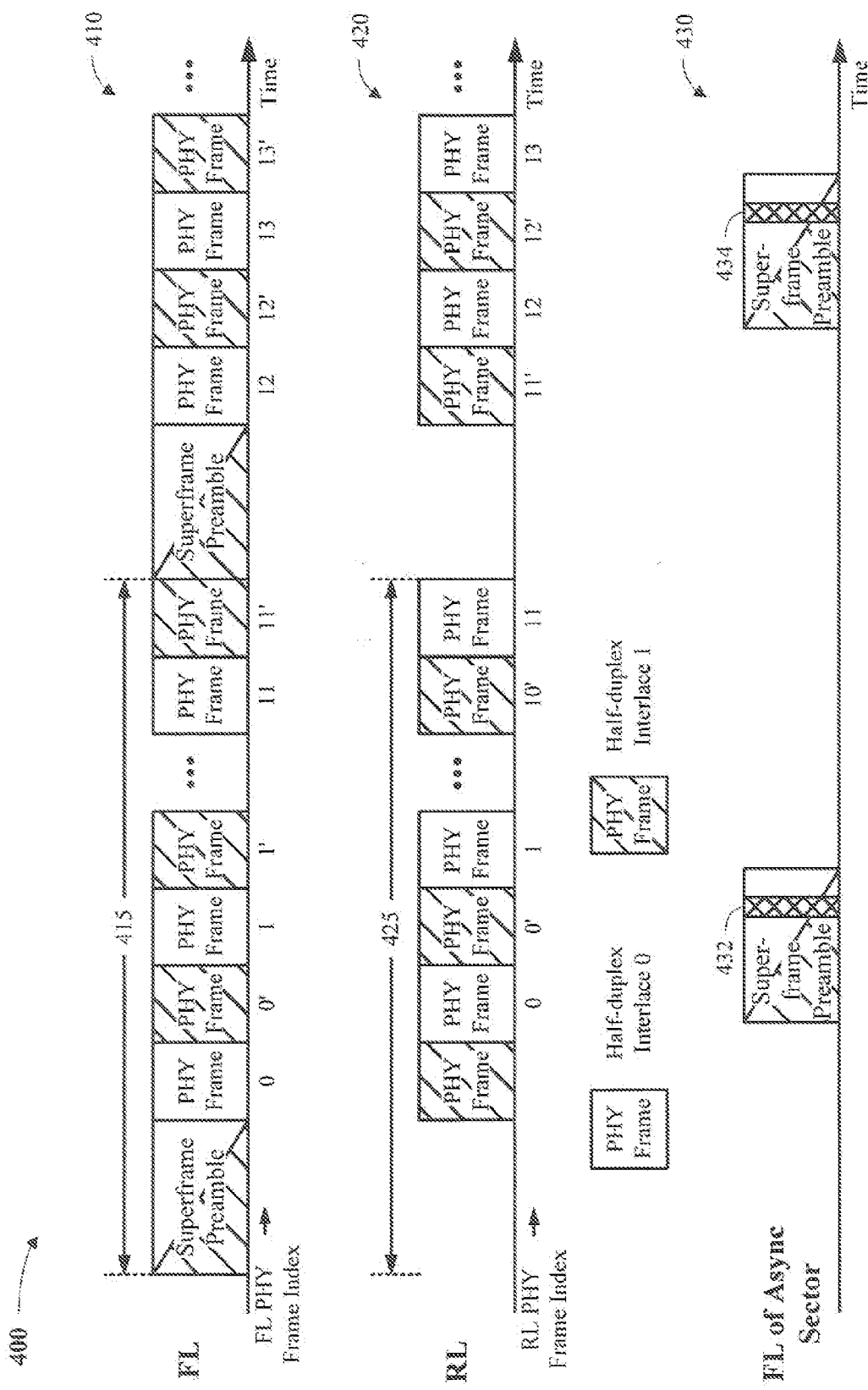
FIGS. 4A-4B illustrate an example superframe structure utilized by asynchronously operating sectors in a wireless communication system.
Figure 4B:
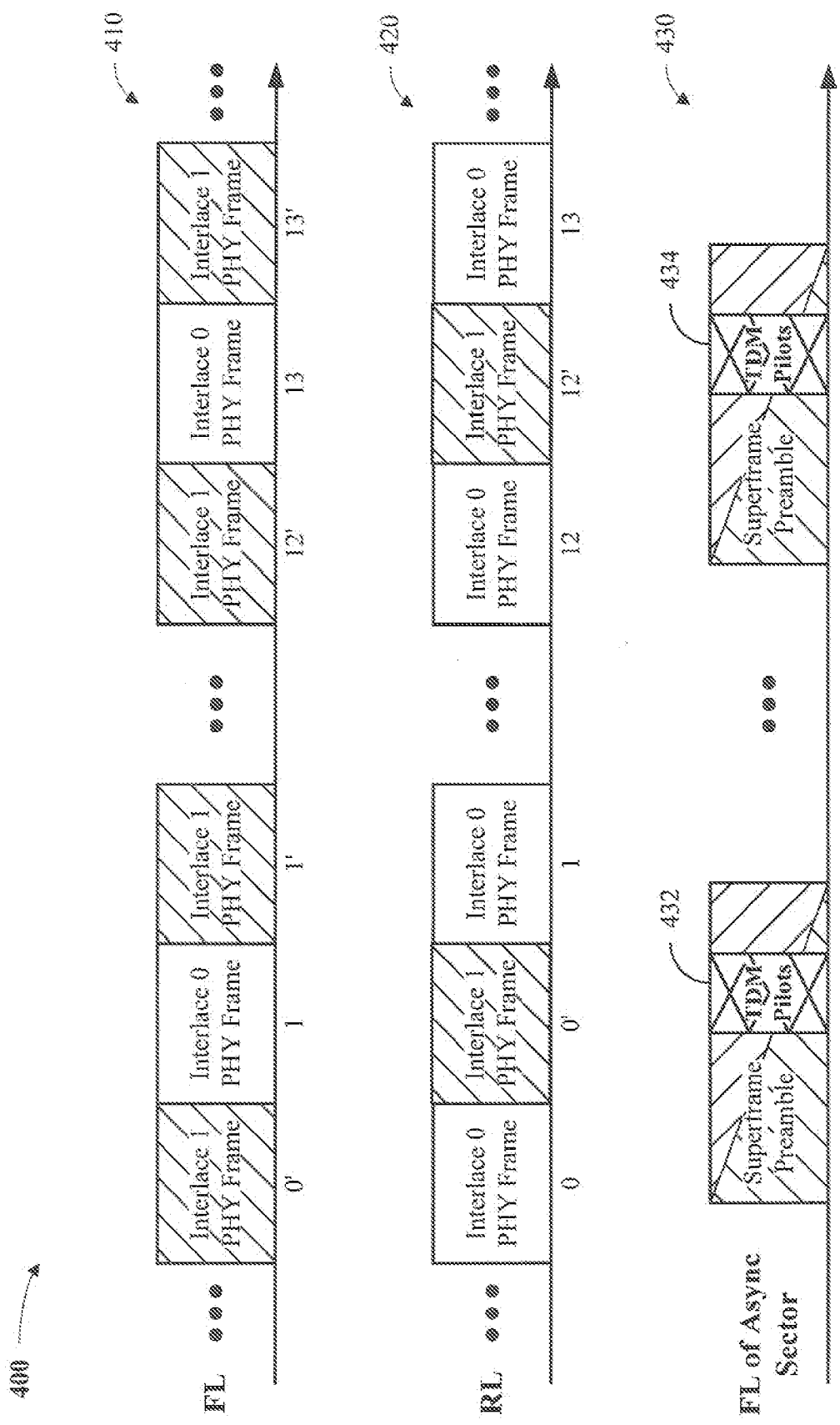

FIG. 4A and FIG. 4B are diagrams illustrating an example superframe structure 400 that can be utilized by sectors (e.g. base stations 210 or antenna groups within one or more base stations 210) in a wireless communication system (e.g., system 200) that operate in an asynchronous mode. With reference to FIG. 4A, transmission timelines for asynchronous sectors are illustrated for a series of FL superframes 415 and RL superframes 425. In one example, transmission timelines 410 and 420 respectively correspond to FL and RL transmission timelines for a sector in the system illustrated by superframe structure 400. As illustrated by FIG. 4A, transmission timelines 410 and 420 can be similar in structure to respective transmission timelines 310 and 320 illustrated and described with respect to superframe structure 300. By way of specific example, each FL superframe 415 in timeline 410 can include a superframe preamble followed by 24 frames, and each RL superframe 425 in timeline 420 can include 24 frames that are preceded by a FL superframe preamble in a corresponding FL superframe 415. In addition, frames in timelines 410 and 420 can be divided between half-duplex interlaces in an alternating fashion such that FL frames and RL frames are staggered between the interlaces as shown in superframe structure 400. Accordingly, an equal number of FL and RL frames can be allocated for each interlace at superframes 415 and 425 in superframe structure 400, and a given frame position in a superframe can be configured to always correspond to a given communication link for a given interlace.

In accordance with one aspect, transmission timeline 430 illustrates the forward link of a neighboring sector that operates asynchronously from a sector corresponding to timelines 410 and 420. As illustrated by superframe structure 400, it can be observed that an offset can be present between a superframe preamble in the timeline 430 of an asynchronous sector and a corresponding superframe preamble provided in FL timeline 410. As can further be observed, superframe preambles in the timeline 430 of an asynchronous sector can be offset such that they coincide with frames in the timeline 410 and 420 of another sector.

To establish communication with terminals currently being served by a sector providing timelines 410 and 420 and/or another sector, a neighboring sector utilizing FL timeline 430 can transmit pilots 432-434 and/or other information necessary for signal acquisition during one or more superframe preambles. In one example, pilots 432-434 can be transmitted at a uniform time within a superframe preamble as illustrated in superframe structure 400. Additionally and/or alternatively, pilots 432-434 can be transmitted at varying locations within a superframe preamble or within one or more predetermined FL frames (not shown) in timeline 430. However, because of the offset between sectors caused by the asynchronous mode in which the sector providing timeline 430 operates, some or all of the pilots 432-434 and/or other information needed to establish connection with a terminal may always be transmitted during frames allocated to RL communication for an interlace on timeline 420. Consequently, a terminal operating on a single half-duplex interlace may be unable to detect a sector whose pilot transmission coincides with the terminal's RL transmission.

FIG. 4B illustrates a detailed view of superframe structure 400. In particular, FIG. 4B illustrates frames in FL timeline 410 and RL timeline 420 corresponding to the transmission of superframe preambles by a neighboring asynchronous sector on timeline 430. As can be observed, TDM pilots 432-434 can be transmitted as part of respective superframe preambles by the asynchronous sector in timeline 430. In the specific example illustrated by FIG. 4B, TDM pilots 432-434 are transmitted at frames 1 and 13 of interlace 0 and frames 0' and 12' of interlace 1. As further illustrated by FIG. 4B, TDM pilots 432-434 in superframe structure 400 can be exclusively received at FL frames of interlace 0 and RL frames of interlace 1. As a result, half-duplex terminals using interlace 0 are given the ability to detect the neighboring sector by using pilots 432-434 at all superframes, while half-duplex terminals using interlace 1 are rendered unable to detect the neighboring sector from pilots 432-434 at any superframe.

Figure 5A:
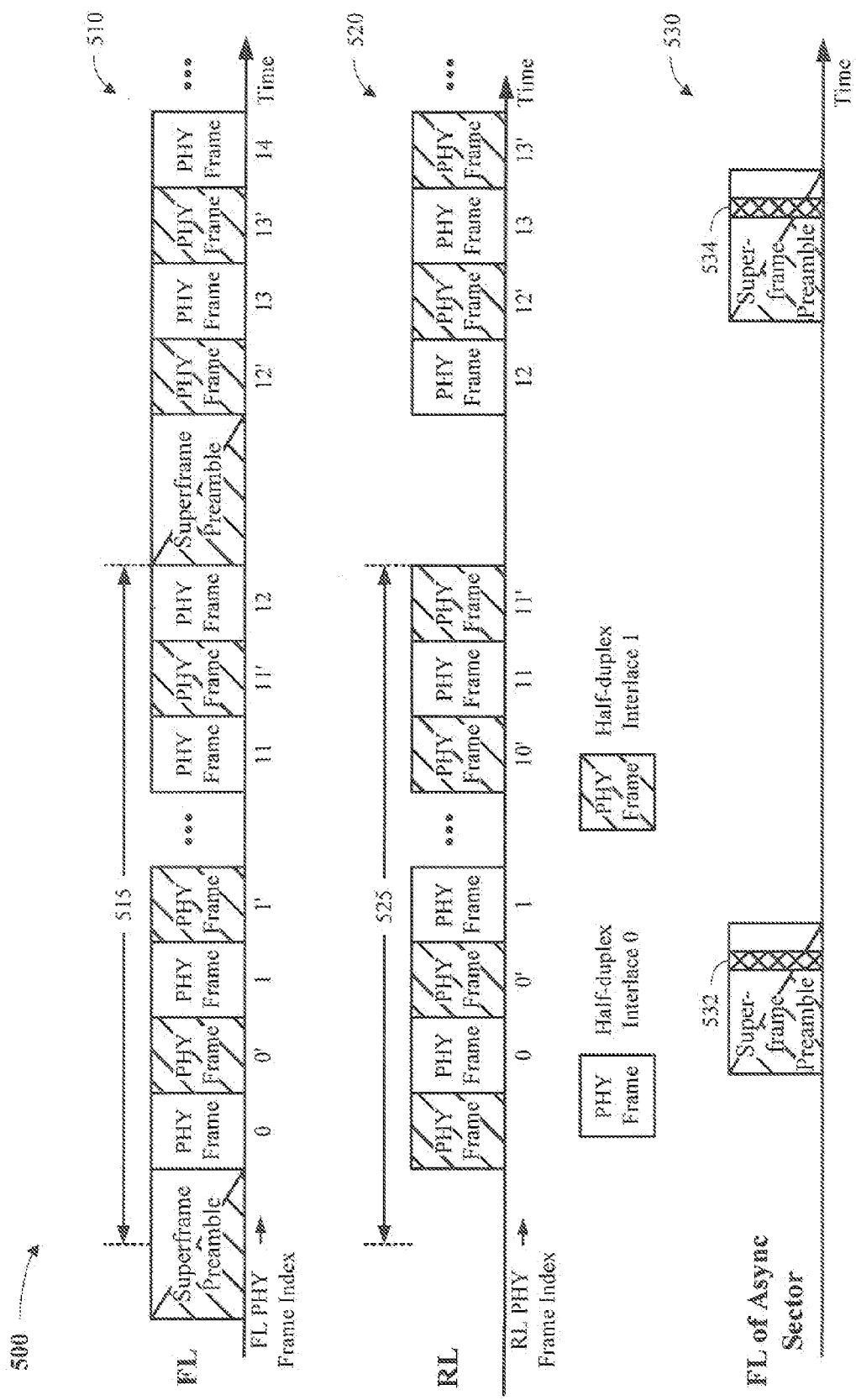
FIGS. 5A-5B illustrate an example superframe structure that facilitates communication with asynchronously operating sectors in a wireless communication system.
Figure 5B:
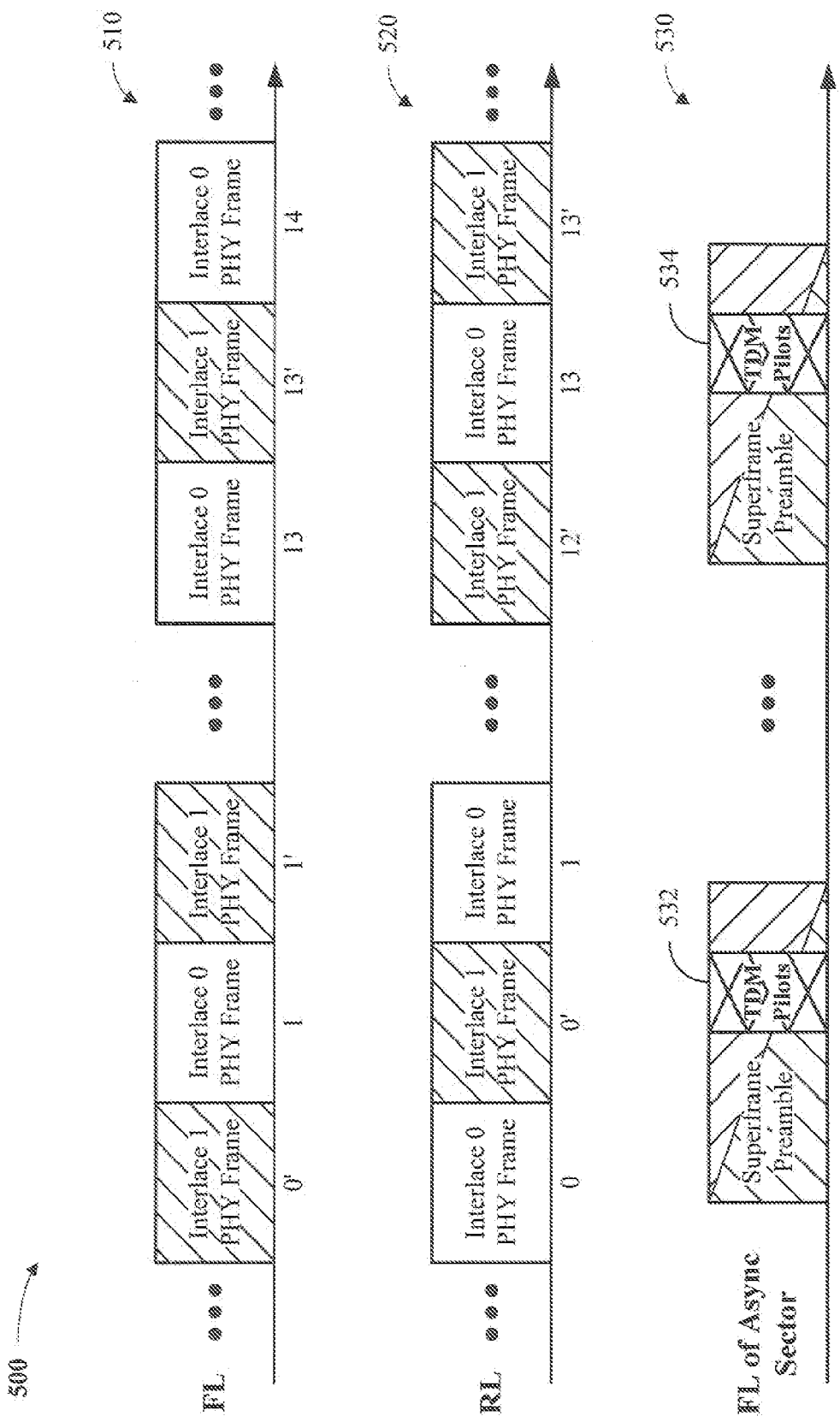

FIG. 5A and FIG. 5B are diagrams illustrating an example superframe structure 500 that facilitates communication with asynchronously operating sectors in a wireless communication system. With reference to FIG. 5A, transmission timelines 510 and 520 for a given sector in a wireless communication system and a FL transmission timeline 530 of a neighboring asynchronous sector are illustrated for a series of FL superframes 515 and RL superframes 525 in a similar manner to FIG. 4A. In accordance with one aspect, a neighboring sector using FL timeline 530 can transmit pilots 532-534 and/or other information necessary to establish communication with terminals currently being served by a sector providing timelines 510 and 520 and/or another sector during one or more superframe preambles. As can be observed from superframe structure 500, superframe preambles in timeline 530 and pilots 532-534 transmitted therein can be offset such that they coincide with frames in timelines 510-520 at a given frame position. Thus, in a similar manner to superframe structure 400, pilots 532-534 can be communicated at a set frame position in each superframe.

To mitigate the problems described with respect to superframe structure 400, frames in superframe structure 500 can be structured and/or interlaced such that a given frame position in a superframe alternates between the forward and reverse links for a given interlace. By way of specific, non-limiting example, this can be accomplished by structuring superframes in superframe structure 500 such that each superframe contains an odd number of frames. In the specific example illustrated by structure 500, each FL superframe 515 and RL superframe 525 can contain 25 frames. Frames within each superframe can then be assigned to half-duplex interlaces in an alternating fashion in a similar manner to superframe structures 300 and 400 to obtain a staggered assignment of frames between half-duplex interlaces. In contrast to superframe structures 300 and 400, however, given frame positions in superframe structure 500 can alternate between communication links for a given half-duplex interlace as a result of each superframe containing an odd number of frames.

FIG. 5B illustrates a detailed view of superframe structure 500. In particular, FIG. 5B illustrates frames in FL timeline 510 and RL timeline 520 corresponding to the transmission of superframe preambles by a neighboring asynchronous sector on timeline 530. As can be observed, TDM pilots 532-534 can be transmitted as part of respective superframe preambles by the asynchronous sector in timeline 530. In the specific example illustrated by FIG. 5B, TDM pilots 532-534 are transmitted at frames 1 and 13 of interlace 0 and frames 0' and 13' of interlace 1. As can be observed from FIG. 5B, because the communication link used by a given interlace at a given frame location within superframes alternates in superframe structure 500, both half-duplex terminals utilizing interlace 0 and half-duplex terminals utilizing interlace 1 are given the ability to detect a neighboring sector transmitting pilots 532-534 at alternating superframes.

Figure 6:
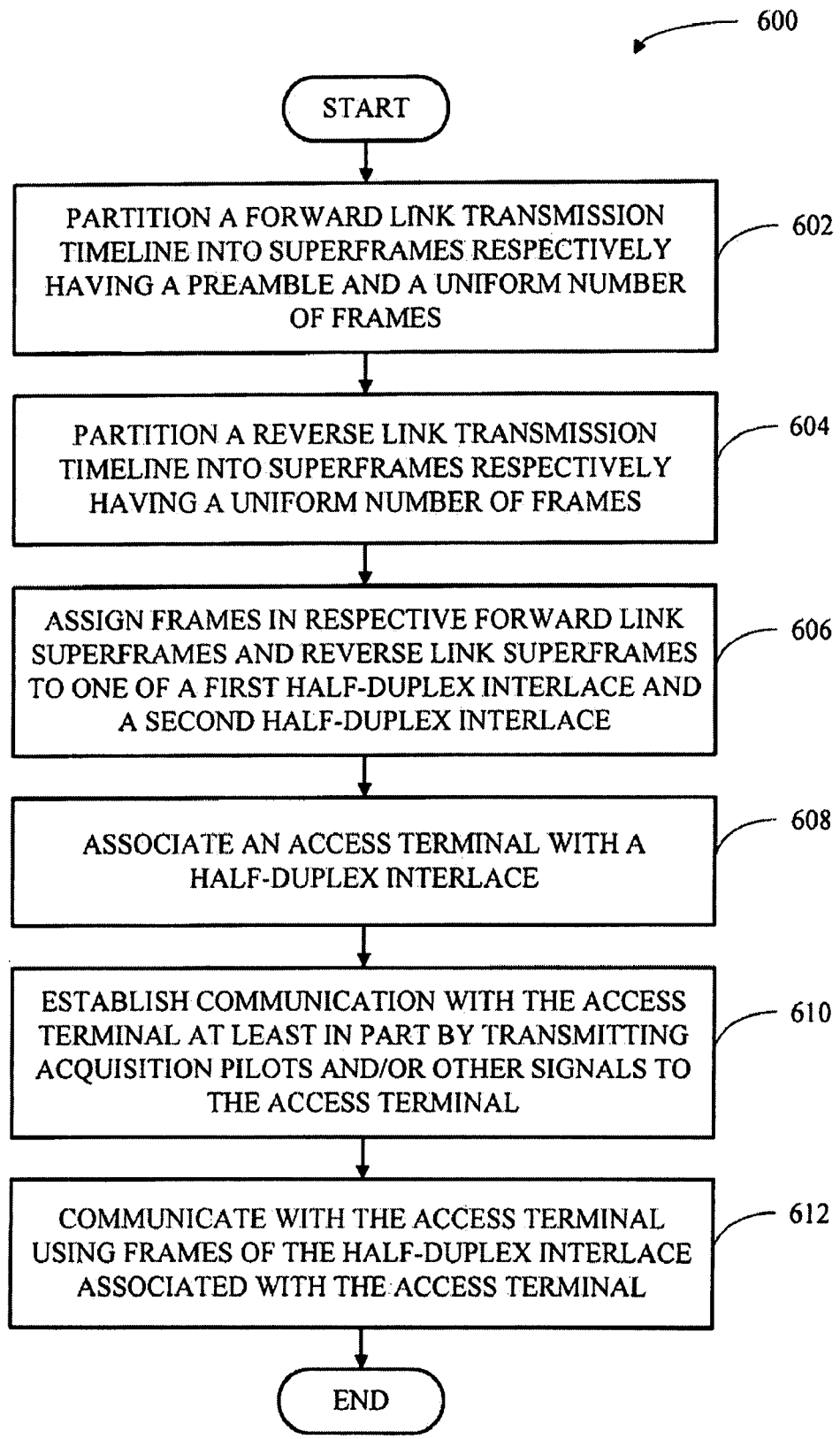
FIG. 6 is a flow diagram of a methodology for half-duplex communication with an access terminal in a wireless communication system.
Figure 7:
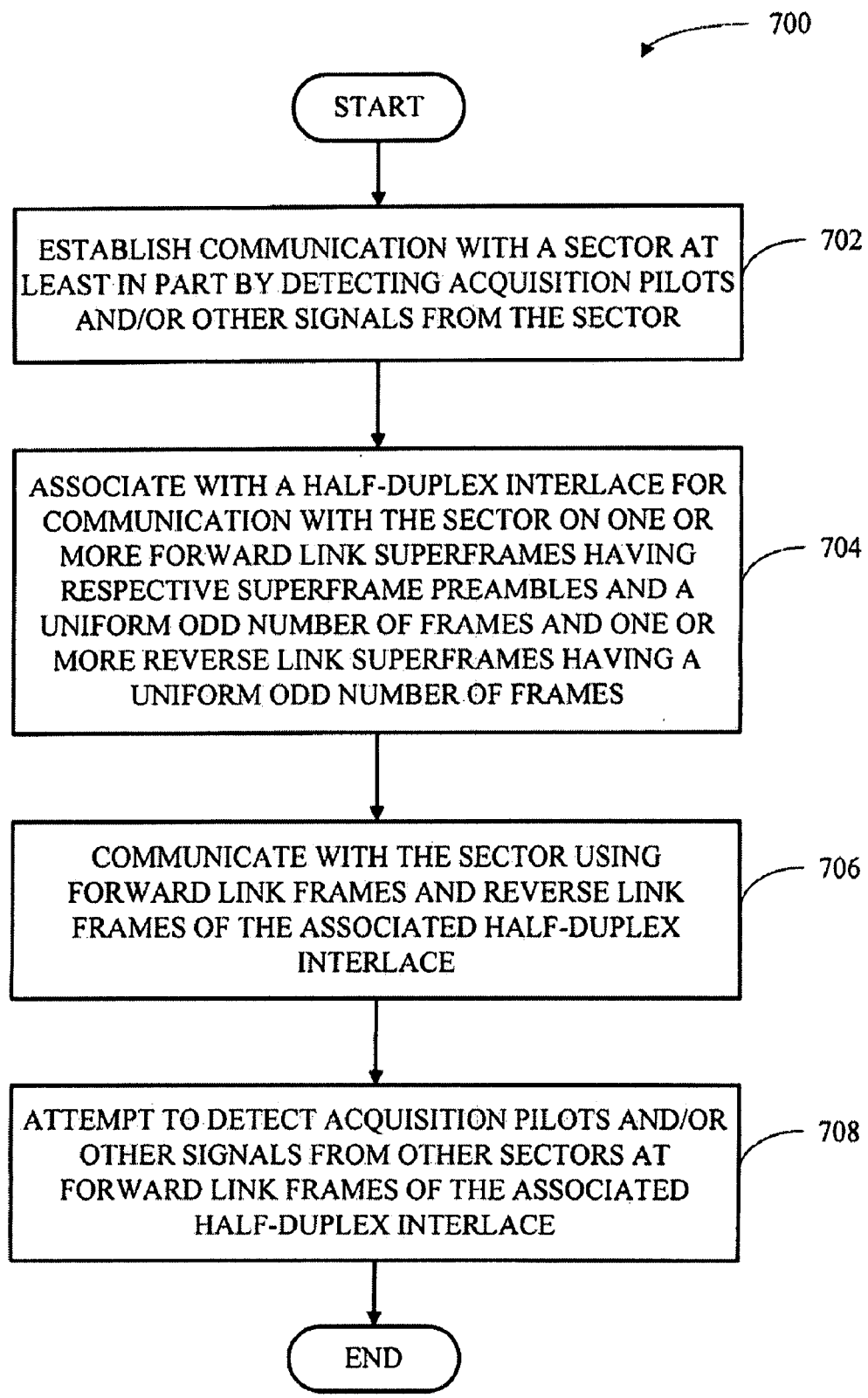
FIG. 7 is a flow diagram of a methodology for half-duplex communication with one or more asynchronously operating sectors in a wireless communication system.

Referring to FIGS. 6-7, methodologies for supporting signal acquisition in wireless communication systems that utilize half-duplex communication and asynchronously operating sectors are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 6, illustrated is a methodology 600 for half-duplex communication with an access terminal (e.g., a terminal 220) in a wireless communication system (e.g., a system 200). It is to be appreciated that methodology 600 can be performed by, for example, a base station (e.g. a base station 210), an antenna group within a base station, and/or another appropriate network entity. Methodology 600 begins at blocks 602 and 604, wherein a FL transmission timeline (e.g., a FL transmission timeline 310) is partitioned into superframes (e.g., FL superframes 315) respectively containing a superframe preamble and a uniform number of frames and a corresponding RL transmission timeline (e.g. a RL transmission timeline 320) is partitioned into superframes (e.g., RL superframes 325) respectively containing a uniform number of frames. In one example, FL superframes and RL superframes can be respectively partitioned at blocks 602 and 604 to include an odd number of frames to enable greater flexibility for supporting half-duplex communication among asynchronously operating sectors as will be described infra.

Upon partitioning the FL and RL transmission timelines at blocks 602 and 604, methodology 600 can continue to block 606, wherein frames in respective FL and RL superframes are assigned to one of a first half-duplex interlace and a second half-duplex interlace. In one example, frames are assigned at block 606 in an alternating fashion such that FL and RL frames are staggered between the half-duplex interlaces in a similar manner to the interlace assignments illustrated by superframe structures 300, 400, and 500. As illustrated by superframe structure 400, a staggered assignment of frames can cause pilots (e.g., pilots 432-434) and/or other signals transmitted by a sector operating asynchronously to a sector utilizing methodology 600 to be transmitted at a given frame position in respective FL and RL superframes. Thus, to ensure that half-duplex terminals operating on both the first half-duplex interlace and the second half-duplex interlace are able to detect these pilots, frames can be assigned at block 606 such that a given frame position within a superframe alternates between FL and RL communication for both interlaces. By way of specific, non-limiting example, superframes can be allocated at blocks 602 and 604 to include an odd number of frames. Based on this allocation, a staggered assignment of frames can be made at block 606 to vary the communication link used by an interlace at a given frame position in a similar manner to the interlace assignment illustrated by superframe structure 500.

Methodology 600 can then continue to block 608, wherein an access terminal is associated with a half-duplex interlace. Based on this association, communication using the associated half-duplex interlace can be established with the access terminal at block 610. In one example, communication is established with an access terminal at block 610 by transmitting acquisition pilots (e.g. pilots generated by a pilot generation component 212) and/or other signals to the access terminal. Finally, at block 612, communication is conducted with the access terminal using frames of the half-duplex interlace associated with the access terminal at block 608. In one example, forward link communication may be conducted at block 612 using a first frequency channel in forward link frames of the associated half-duplex interlace and reverse link communication may be conducted at block 612 using a second frequency channel in reverse link frames of the associated half-duplex interlace.

FIG. 7 illustrates a methodology 700 for half-duplex communication with one or more asynchronously operating sectors (e.g., base stations 210 and/or antenna groups within one or more base stations 210) in a wireless communication system (e.g. system 200). It is to be appreciated that methodology 700 can be performed by, for example, a terminal (e.g., a terminal 220) and/or any other suitable network entity. Methodology 700 begins at block 702, wherein communication is established with a sector at least in part by detecting acquisition pilots and/or other signals from the sector (e.g., by using a pilot detection component 222).

Methodology 700 the continues to block 704, wherein an entity performing methodology 700 associates with a half-duplex interlace for communication with the sector from which acquisition signals were received at block 702 on one or more FL superframes (e.g., FL superframes 315) and RL superframes (e.g. RL superframes 325). In one example, FL superframes over which communication is to occur can be configured (e.g., by an interlacing component 214 and/or 224 or by another appropriate network entity) to include a superframe preamble followed by a uniform number of frames, and each corresponding RL superframe can be configured to include a uniform number of frames that correspond to FL frames in time. In another example, a half-duplex interlace at block 704 can include FL and RL frames that are assigned in an alternating fashion such that FL and RL frames are staggered between multiple half-duplex interlaces in a similar manner to the interlace assignments illustrated by superframe structures 300, 400, and 500. Further, to ensure that half-duplex terminals operating on all half-duplex interlaces are able to detect pilots and/or other signals necessary to establish communication with neighboring sectors (e.g., at block 708), frames can be assigned to the half-duplex interlaces such that a given frame position within a superframe alternates between FL and RL communication for a given interlace. In one specific example, this can be accomplished by allocating each FL and RL superframe to include an odd number of frames and then utilizing a staggered assignment of frames between half-duplex interlaces in a similar manner to superframe structure 500.

Upon completing the act described in block 704, methodology 700 continues to block 706, wherein communication is conducted with the sector with which communication was established at block 702 using FL and RL frames of the half-duplex interlace associated with an entity performing methodology 700 at block 704. In one example, forward link communication may be conducted at block 706 using a first frequency channel in forward link frames of the associated half-duplex interlace and reverse link communication may be conducted at block 706 using a second frequency channel in reverse link frames of the associated half-duplex interlace.

Methodology 700 can concludes at block 708, wherein an entity performing methodology 700 attempts to detect acquisition pilots and/or other signals from other sectors at FL frames of the associated half-duplex interlace. As noted generally supra, sectors from which signals are detected at block 708 can operate asynchronously from a sector with which communication is conducted at block 706 such that pilots from the asynchronous sectors are received at one or more frame positions within a given superframe. By associating with a half-duplex interlace at block 704 that varies between FL and RL communication for a given frame position, an entity performing methodology 700 can detect signals from asynchronous sectors at block 708 irrespective of the time at which the signals are received.

Figure 8:
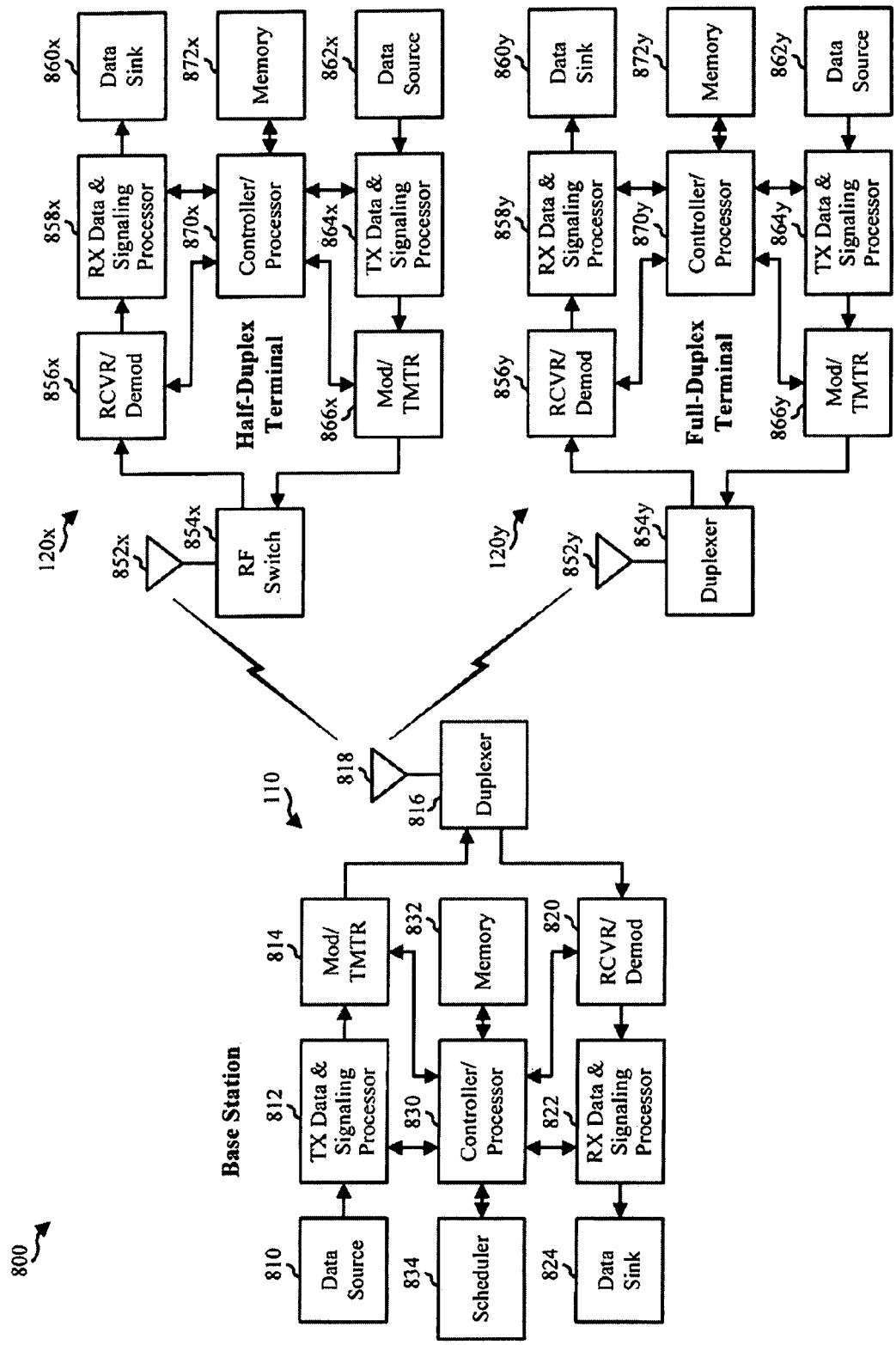
FIG. 8 is a block diagram illustrating an example wireless communication system in which one or more embodiments described herein may function.

Referring now to FIG. 8, a block diagram illustrating an example wireless communication system 800 in which one or more embodiments described herein may function is provided. In accordance with one aspect, the system 800 includes a base station 110, a half-duplex terminal 120x, and a full-duplex terminal 120y. In one example, base station 110 includes a transmit (TX) data and signaling processor 812 that can receive traffic data from a data source 810 and signaling from a controller/processor 830 and/or a scheduler 834. The controller/processor 830 can provide system information for a superframe preamble and/or signaling (e.g., ACKs, PC commands, erasure indicators, . . . ) for one or more terminals communicating with base station 110, and the scheduler 834 can provide assignments of resources (e.g., data channels, frames, and/or subcarriers) on the forward and/or reverse link for the terminals. Additionally, TX data and signaling processor 812 can process (e.g. encode, interleave, and/or symbol map) traffic data and signaling to respectively provide data symbols and signaling symbols. Base station 110 may further include a modulator (Mod) 814 that multiplexes pilot symbols with the data and signaling symbols, performs modulation on the multiplexed symbols (e.g., for OFDMA and/or CDMA), and provides output chips. Further, a transmitter (TMTR) 814 can condition (e.g., convert to analog, amplify, filter, and/or upconvert frequency) the output chips and generate a forward link signal. This forward link signal can then be routed through a duplexer 816 and transmitted via an antenna 818.

In another example, half-duplex terminal 120x can include an antenna 852x that receives forward link signals from one or more base stations including base station 110. Half-duplex terminal 120x can also include a radio frequency (RF) switch 854x that connects antenna 852x to a receiver (RCVR) 856x during forward link frames and connects antenna 852x to a transmitter 866x during reverse link frames.

Additionally and/or alternatively, full-duplex terminal 120y can include an antenna 852y that receives forward link signals from one or more base stations including base station 110. Full-duplex terminal 120y can also include a duplexer 854y that routes a received signal from antenna 852y to a receiver 856y and further routes a reverse link signal from a transmitter 866y to antenna 852y.

Further, each terminal 120x and 120y can include a receiver 856 that conditions (e.g., filters, amplifies, frequency downconverts, and/or digitizes) the received signal from antenna 852 and provides samples. Terminals 120x and 120y may further include a demodulator (Demod) 856 that performs demodulation on the samples (e.g., for OFDMA and/or CDMA) and provides symbol estimates. A receive (RX) data and signaling processor 858 can also be included in terminals 120x and 120y to process (e.g., symbol demap, deinterleave, and/or decode) the symbol estimates, provide decoded data to a data sink 860, and provide detected signaling (e.g., assignments, ACKs, PC commands, erasure indicators, . . . ) to a controller/processor 870. In accordance with one aspect, the processing by RX data and signaling processors 858 and demodulators 856 is complementary to the processing by TX data and signaling processor 812 and modulator 814, respectively, at base station 110.

On the reverse link, a TX data and signaling processor 864 at each terminal 120x and 120y can process traffic data from a data source 862 and signaling from controller/processor 870 and generate symbols. The symbols can then be modulated by a modulator 866 and conditioned by transmitter 866 to generate a reverse link signal. The reverse link signal can then be passed through RF switch 854x to be transmitted via antenna 852x in terminal 120x and/or routed through duplexer 854y to be transmitted via antenna 852y in terminal 120y. At base station 110, reverse link signals from one or more terminals including terminals 120x and/or 120y can be received by antenna 818, routed through duplexer 816, conditioned by a receiver 820, demodulated by a demodulator 820, and processed by an RX data and signaling processor 822. In one example, RX data and signaling processor 822 can provide decoded data to a data sink 824 and detected signaling to controller/processor 830.

In accordance with one aspect, controllers/processors 830, 870x and 870y can direct the operations of various processing units at base station 110 and terminals 120x and 120y, respectively. In one example, controller/processor 830 can implement methodologies 900, 1000, 1100, and/or other appropriate methodologies. Additionally and/or alternatively, controller/processor 870 may implement methodologies 900, 1000, and/or other appropriate methodologies. In accordance with another aspect, memories 832, 872x and 872y can store data and program codes for base station 110 and terminals 120x and 120y, respectively. Further, scheduler 834 can schedule terminals communicating with base station 110 and assign resources (e.g. data channels, frames, and/or subcarriers) to the scheduled terminals.

Figure 9:
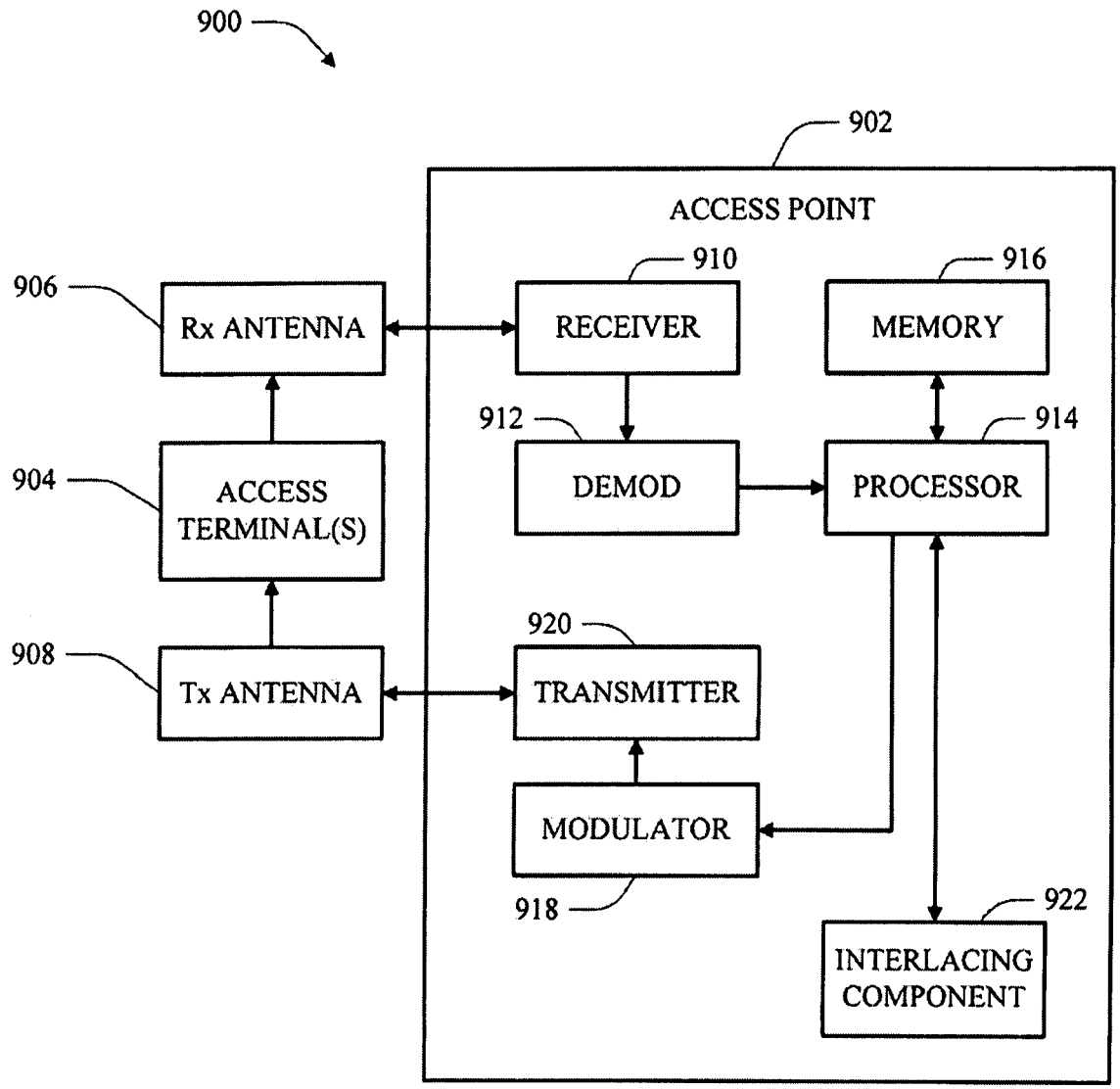
FIG. 9 is a block diagram of a system that coordinates half-duplex communication in an asynchronously operating wireless communication system in accordance with various aspects.

FIG. 9 is a block diagram of a system 900 that coordinates half-duplex communication in an asynchronously operating wireless communication system in accordance with various aspects described herein. In one example, system 900 includes a base station or access point 902. As illustrated, access point 902 can receive signal(s) from one or more access terminals 904 via a receive (Rx) antenna 906 and transmit to the one or more user devices 904 via a transmit (Tx) antenna 908.

Additionally, access point 902 can comprise a receiver 910 that receives information from receive antenna 906. In one example, the receiver 910 can be operatively associated with a demodulator (Demod) 912 that demodulates received information. Demodulated symbols can then be analyzed by a processor 914. Processor 914 can be coupled to memory 916, which can store information related to code clusters, access terminal assignments, lookup tables related thereto, unique scrambling sequences, and/or other suitable types of information. Additionally and/or alternatively, processor 914 can be coupled to an interlacing component 922, which can facilitate the creation of half-duplex interlaces from a transmission timeline (e.g., forward link transmission timeline 310 and reverse link transmission timeline 320) and/or the assignment of one or more access terminals 904 to one or more half-duplex interlaces. In one example, access point 902 can employ interlacing component 922 to perform methodology 600 and/or other similar and appropriate methodologies either in conjunction with or independent from processor 914. Access point 902 can also include a modulator 918 that can multiplex a signal for transmission by a transmitter 920 through transmit antenna 908 to one or more access terminals 904.

Figure 10:
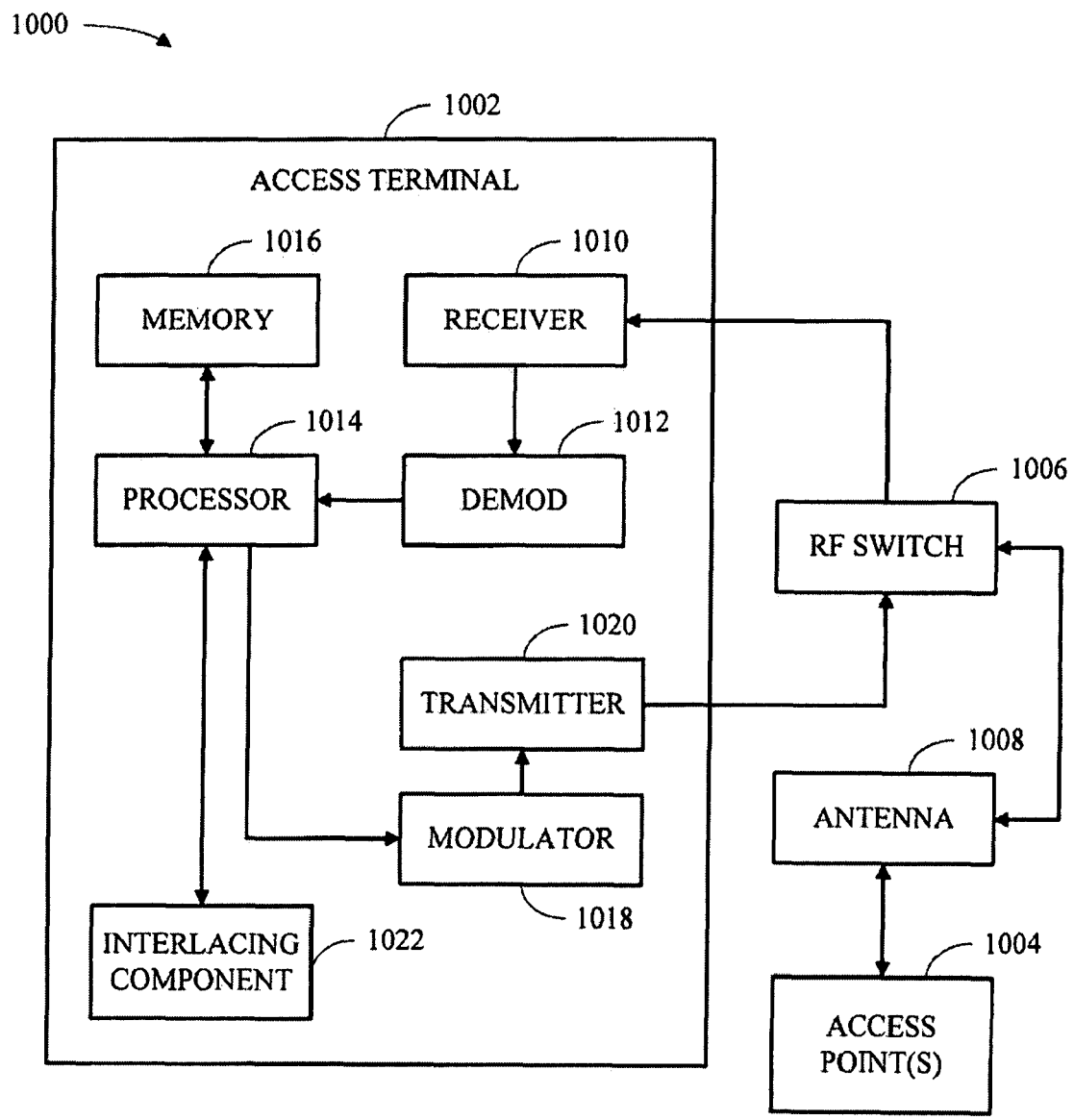
FIG. 10 is a block diagram of a system that coordinates half-duplex communication in an asynchronously operating wireless communication system in accordance with various aspects.

FIG. 10 is a block diagram of a system 1000 that coordinates half-duplex communication in an asynchronously operating wireless communication system in accordance with various aspects described herein. In one example, system 1000 includes an access terminal 1002. As illustrated, access terminal 1002 can receive signal(s) from one or more access points 1004 and transmit to the one or more base stations 1004 via an antenna 1008. In one example, whether the antenna is operable to receive or transmit data at a given time is controlled by an RF switch 1006.

Additionally, access terminal 1002 can comprise a receiver 1010 that receives information from antenna 1008. In one example, the receiver 1010 can be operatively associated with a demodulator (Demod) 1012 that demodulates received information. Demodulated symbols can then be analyzed by a processor 1014. Processor 1014 can be coupled to memory 1016, which can store data and/or program codes related to access terminal 1002. Additionally and/or alternatively, processor 1014 can be coupled to an interlacing component 1022, which can facilitate the assignment of access terminal 1002 to a half-duplex interlace. In one example, access terminal 1002 can employ interlacing component 1022 to perform methodology 700 and/or other similar and appropriate methodologies either in conjunction with or independent from processor 1014. Access terminal 1002 can also include a modulator 1018 that can multiplex a signal for transmission by a transmitter 1020 through antenna 1008 to one or more access points 1004.

Figure 11:
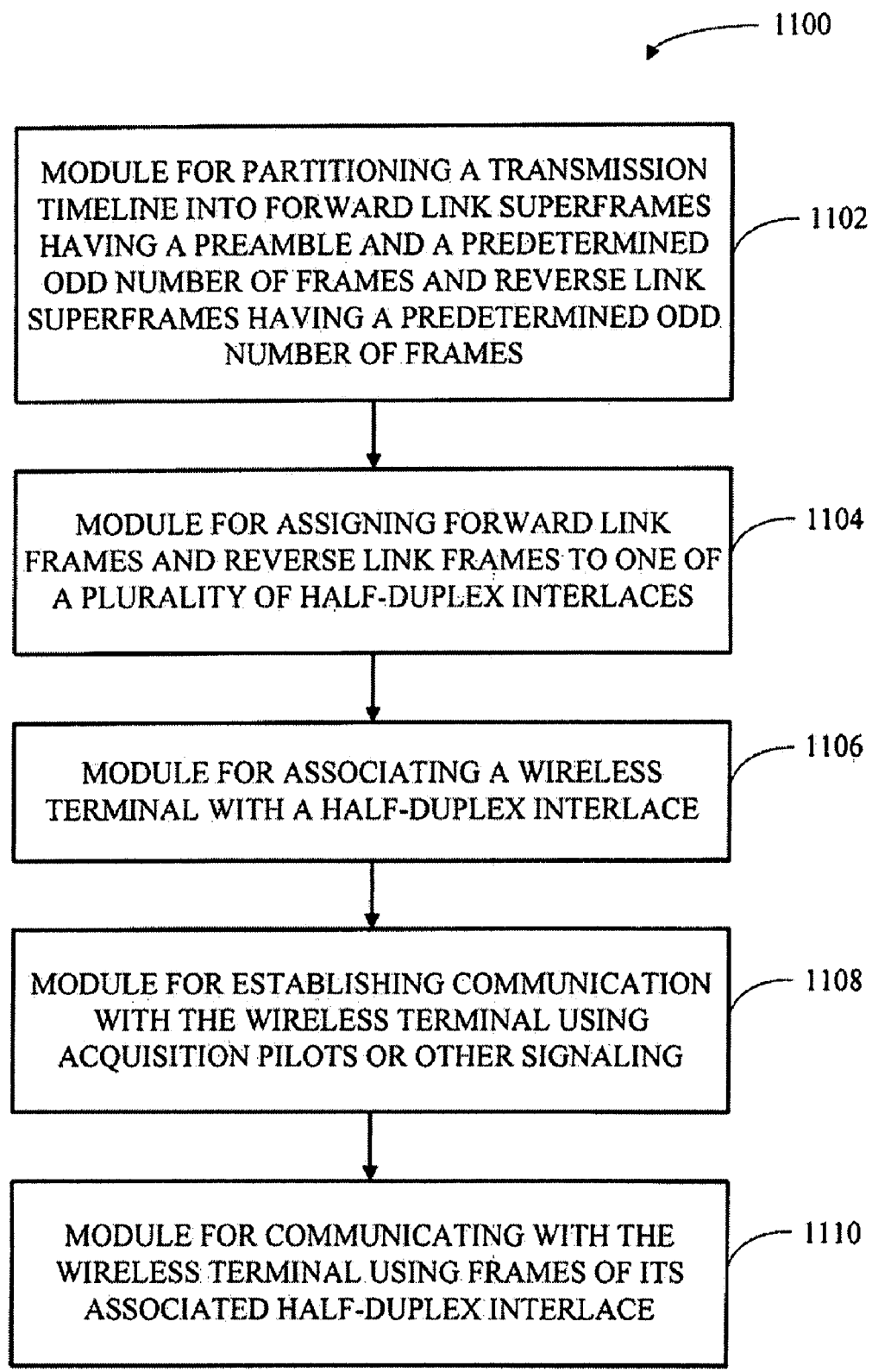
FIG. 11 is a block diagram of an apparatus that facilitates half-duplex communication with a wireless terminal.

FIG. 11 illustrates an apparatus 1100 that facilitates half-duplex communication with a wireless terminal (e.g., a terminal 220 in system 200). It is to be appreciated that apparatus 1100 is represented as including functional blocks, which can be functional blocks that represent functions implemented by a processor, software, or combination thereof (e.g., firmware). Apparatus 1100 can be implemented in a base station (e.g., a base station 210) and/or another suitable network entity and can include a module for partitioning a transmission timeline (e.g., a superframe structure 500) into forward link superframes (e.g. forward link superframes 515) having a preamble and a predetermined odd number of frames and reverse link superframes (e.g., reverse link superframes 525) having a predetermined odd number of frames 1102. Further, apparatus 1100 can include a module for assigning forward link frames and reverse link frames to one of a plurality of half-duplex interlaces 1104, a module for associating a wireless terminal with a half-duplex interlace 1106, a module for establishing communication with the wireless terminal using acquisition pilots or other signaling 1108, and a module for communicating with the wireless terminal using frames of the associated half-duplex interlace 1110.

Figure 12:
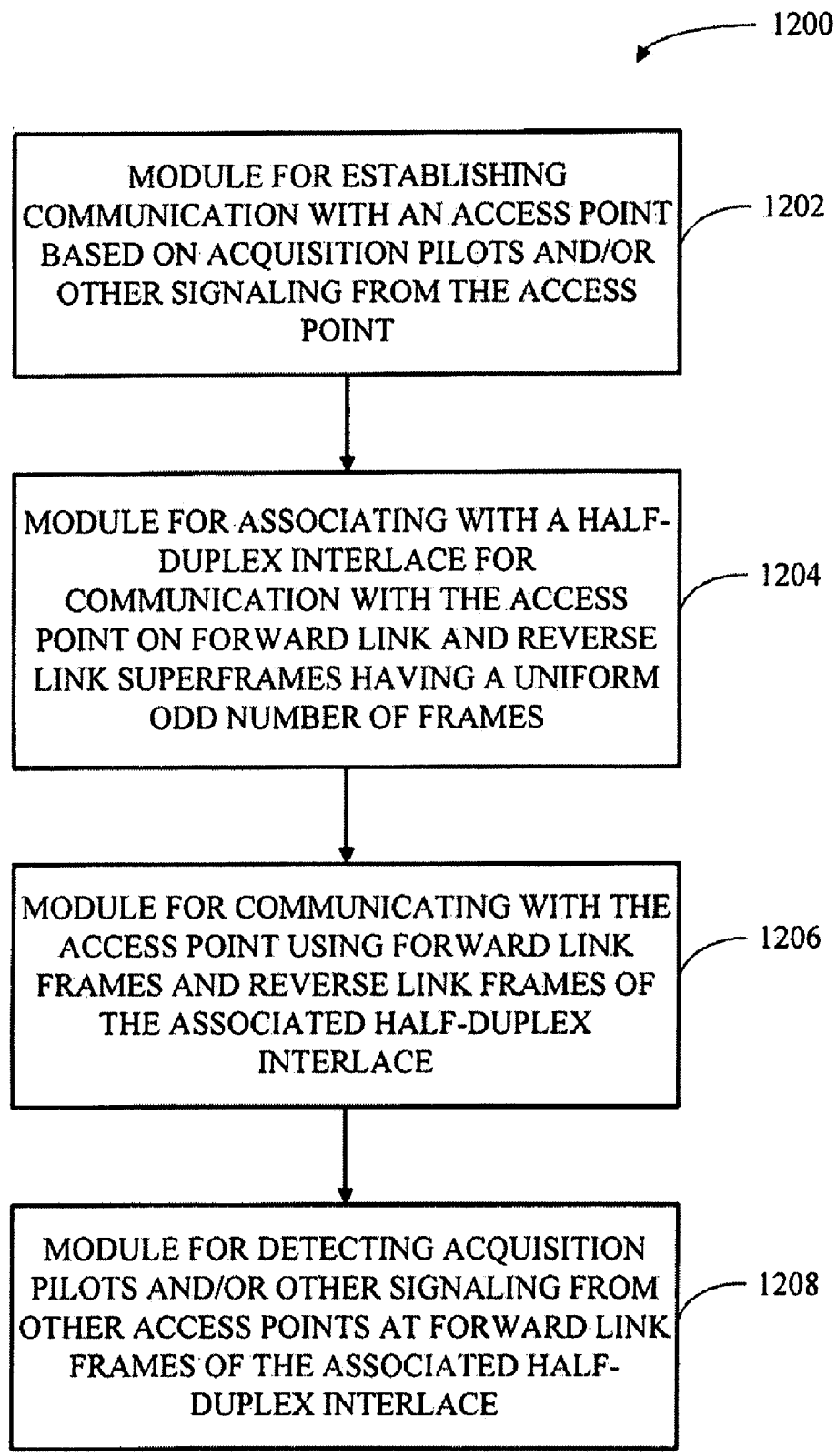
FIG. 12 is a block diagram of an apparatus that facilitates half-duplex communication with one or more asynchronous wireless access points.

FIG. 12 illustrates an apparatus 1200 that facilitates half-duplex communication with one or more asynchronous wireless access points (e.g., base stations 210 in system 200). It is to be appreciated that apparatus 1200 is represented as including functional blocks, which can be functional blocks that represent functions implemented by a processor, software, or combination thereof (e.g., firmware). Apparatus 1200 can be implemented in a terminal (e.g. a terminal 220) and/or another suitable network entity and can include a module for establishing communication with an access point based on acquisition pilots and/or other signaling from the access point 1202. Further, apparatus 1200 can include a module for associating with a half-duplex interlace for communication with the access point on forward link and reverse link superframes having a uniform odd number of frames 1204, a module for communicating with the access point using forward link frames and reverse link frames of the associated half-duplex interlace 1206, and a module for detecting acquisition pilots and/or other signaling from other access points at forward link frames of the associated half-duplex interlace 1208.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for providing half-duplex communication in the presence of asynchronous sectors in a wireless communication system, comprising:
    partitioning transmission timelines on a forward link and a reverse link into superframes having a uniform odd number of frames;
    assigning respective frames in superframes on the forward link and the reverse link to one of a first half-duplex interlace and a second half-duplex interlace, wherein the first half-duplex interlace and the second half-duplex interlace share a common superframe preamble, wherein there is a time interval on the reverse link corresponding to the superframe preamble on the forward link;
    associating a terminal with one or more half-duplex interlaces; and
    communicating with the terminal using frames assigned to the one or more half-duplex interlaces associated with the terminal.

2. The method of claim 1, wherein the assigning respective frames includes:
    assigning every other frame in respective forward link superframes and every other frame in respective reverse link superframes to the first half-duplex interlace such that the frames assigned to the first half-duplex interlace are non-overlapping; and
    assigning frames in the respective forward link superframes and reverse link superframes not assigned to the first half-duplex interlace to the second half-duplex interlace.

3. The method of claim 1, wherein the partitioning transmission timelines includes partitioning transmission timelines on the forward link and reverse link into superframes having 25 frames.

4. The method of claim 1, wherein the communicating with the terminal includes establishing communication with the terminal at least in part by transmitting one or more acquisition pilots to the terminal.

5. The method of claim 4, wherein the partitioning transmission timelines includes partitioning the transmission timeline on the forward link into superframes having the common superframe preamble and a uniform odd number of frames, and the establishing communication with the terminal includes transmitting one or more acquisition pilots on the forward link in a superframe preamble.

6. The method of claim 1, wherein the wireless communication system is a frequency division duplex (FDD) communication system, the forward link is associated with a first frequency channel, and the reverse link is associated with a second frequency channel.

7. The method of claim 6, wherein the communicating with the terminal includes:
    sending one or more of data and signaling via the first frequency channel in forward link frames assigned to the one or more half-duplex interlaces associated with the terminal; and
    receiving one or more of data and signaling via the second frequency channel in reverse link frames assigned to the one or more half-duplex interlaces associated with the terminal.

8. A wireless communications apparatus, comprising:
    a memory that stores data relating to a first half-duplex interlace and a second half-duplex interlace, the first half-duplex interlace and second half-duplex interlace having frames allocated among respective superframes on a forward link and a reverse link having a predetermined odd number of frames such that frames on the forward link and reverse link are staggered between the first half-duplex interlace and the second half-duplex interlace, wherein the first half-duplex interlace and the second half-duplex interlace share a common superframe preamble, wherein there is a time interval on the reverse link corresponding to the superframe preamble on the forward link; and
    a processor configured to associate an access terminal with a half-duplex interlace and to communicate with the access terminal using frames of the associated half-duplex interlace.

9. The wireless communications apparatus of claim 8, wherein the frames in the respective superframes on the forward link and reverse link abut one another.

10. The wireless communications apparatus of claim 8, wherein a guard time is provided between the frames in the respective superframes on the forward link and reverse link to allow an access terminal sufficient time to switch between transmitting and receiving or between receiving and transmitting.

11. The wireless communications apparatus of claim 8, wherein the respective superframes on the forward link and reverse link are 25 frames in length.

12. The wireless communications apparatus of claim 8, wherein the processor is further configured to establish communication with the access terminal by communicating an acquisition pilot to the access terminal.

13. The wireless communications apparatus of claim 8, wherein the memory further stores data relating to loading levels of the first half-duplex interlace and the second half-duplex interlace and the processor is further configured to associate an access terminal with a half-duplex interlace based at least in part on the loading levels.

14. An apparatus that facilitates half-duplex communication in an asynchronously operating wireless communication system, comprising:
    means for dividing frames for a forward link and a reverse link provided by a set of superframes between a first half-duplex interlace and a second half-duplex interlace such that a given frame position in a superframe alternates between forward link communication and reverse link communication for a given half-duplex interlace, wherein the first half-duplex interlace and the second half-duplex interlace share a common superframe preamble, wherein there is a time interval on the reverse link corresponding to the superframe preamble on the forward link; and
    means for determining one or more half-duplex interlaces for communication with a wireless terminal.

15. The apparatus of claim 14, wherein the set of superframes includes one or more forward link superframes and one or more reverse link superframes, the one or more forward link superframes and one or more reverse link superframes contain a predetermined odd number of frames.

16. The apparatus of claim 15, wherein the means for dividing frames includes:
   means for assigning alternating frames in the one or more forward link superframes and non-overlapping frames in the one or more reverse link superframes to the first half-duplex interlace; and
   means for assigning remaining frames in the one or more forward link superframes and the one or more reverse link superframes to the second half-duplex interlace.

17. The apparatus of claim 14, further comprising means for transmitting information to the wireless terminal for establishing communication with the wireless terminal over the one or more half-duplex interlaces determined for communication.

18. The apparatus of claim 17, further comprising communicating with the wireless terminal at frames of the one or more half-duplex interlaces determined for communication.

19. A non-transitory, computer-readable medium, comprising:
   code for causing a computer to divide transmission timelines for a forward link and a reverse link into superframes having a constant odd number of frames; and
   code for causing a computer to assign frames in respective superframes to one of a plurality of half-duplex interlaces such that frames are staggered between the half-duplex interlaces, wherein at least two of the plurality of half-duplex interlaces share a common superframe preamble, wherein there is a time interval on the reverse link corresponding to the superframe preamble on the forward link.

20. The non-transitory, computer-readable medium of claim 19, wherein the code for causing a computer to divide transmission timelines includes code for causing a computer to divide transmission timelines for the forward link and the reverse link into superframes having 25 frames.

21. The non-transitory, computer-readable medium of claim 19, wherein the plurality of half-duplex interlaces includes a first half-duplex interlace and a second half-duplex interlace.

22. The non-transitory, computer-readable medium of claim 19, further comprising:
   code for causing a computer to determine one or more half-duplex interlaces for use from the plurality of half-duplex interlaces; and
   code for causing a computer to communicate using frames of the one or more half-duplex interlaces determined for use on the forward link and the reverse link.

23. The non-transitory, computer-readable medium of claim 22, wherein the code for causing a computer to communicate includes code for causing a computer to communicate on the forward link using a first frequency channel and code for causing a computer to communicate on the reverse link using a second frequency channel.

24. A processor that executes computer-executable instructions for supporting half-duplex communication in a wireless communication system in the presence of asynchronous access points, the instructions comprising:
   partitioning a transmission timeline for a forward link into respective superframes having a superframe preamble and a uniform odd number of frames;
   partitioning a transmission timeline for a reverse link into respective superframes having a uniform odd number of frames; and
   allocating respective frames in the superframes on the forward link and the reverse link to one of a first half-duplex interlace and a second half-duplex interlace, wherein the first half-duplex interlace and the second half-duplex interlace share the superframe preamble, wherein there is a time interval on the reverse link corresponding to the superframe preamble on the forward link.

25. The processor of claim 24, the instructions further comprising:
   assigning a terminal to one or more of the first half-duplex interlace and the second half-duplex interlace; and
   communicating with the terminal on the forward link and the reverse link on frames allocated to the one or more assigned half-duplex interlaces.

26. A method of half-duplex communication with asynchronously operating sectors in a wireless communication system, comprising:
   associating with one or more of a first half-duplex interlace and a second half-duplex interlace for communication with a first sector on respective superframes for a forward link and a reverse link having a uniform odd number of frames, the first half-duplex interlace and the second half-duplex interlace are assigned to non-overlapping frames in the respective superframes, wherein the first half-duplex interlace and the second half-duplex interlace share a common superframe preamble, wherein there is a time interval on the reverse link corresponding to the superframe preamble on the forward link;
   communicating with the first sector at frames of the one or more associated half-duplex interlaces; and
   attempting to detect a second sector on the forward link at frames of the one or more associated half-duplex interlaces.

27. The method of claim 26, wherein the associating with one or more of a first half-duplex interlace and a second half-duplex interlace includes associating with one or more of a first half-duplex interlace and a second half-duplex interlace for communication on respective superframes for a forward link and a reverse link having 25 frames.

28. The method of claim 26, wherein the communicating with the first sector includes establishing communication with the first sector at least in part by detecting one or more acquisition pilots from the first sector.

29. The method of claim 26, wherein the wireless communication system is a frequency division duplex (FDD) communication system, the forward link is associated with a first frequency channel, and the reverse link is associated with a second frequency channel.

30. The method of claim 29, wherein the communicating with the first sector includes:
   receiving one or more of data and signaling via the first frequency channel on the forward link in frames of one or more of the associated half-duplex interlaces; and
   sending one or more of data and signaling via the second frequency channel on the reverse link in frames of one or more of the associated half-duplex interlaces.

31. The method of claim 26, wherein the attempting to detect a second sector includes attempting to detect an acquisition pilot from the second sector on the forward link in frames of the one or more associated half-duplex interlaces.

32. A wireless communications apparatus, comprising:
   a memory that stores data relating to a half-duplex interlace for communication with a first access point on respective superframes for a forward link and a reverse link having a predetermined odd number of frames and non-overlapping frames in the respective superframes allocated to the half-duplex interlace; and
   a processor configured to communicate with the first access point using the frames allocated to the half-duplex interlace and to detect one or more acquisition pilots from a second access point on the forward link using the frames allocated to the half-duplex interlace, wherein at least two half-duplex interlaces share a common superframe preamble, wherein there is a time interval on the reverse link corresponding to the superframe preamble on the forward link.

33. The wireless communications apparatus of claim 32, wherein the respective superframes for the forward link and the reverse link include 25 frames.

34. The wireless communications apparatus of claim 33, wherein the respective superframes for the forward link further include the superframe preamble.

35. The wireless communications apparatus of claim 34, wherein the processor is further configured to initialize communication with the first access point at least in part by detecting one or more acquisition pilots transmitted by the first access point on the forward link in the superframe preamble.

36. An apparatus that facilitates half-duplex communication in a wireless communication system in the presence of asynchronous base stations, comprising:
    means for associating with a half-duplex interlace chosen from a plurality of half-duplex interlaces for communication with a serving base station, each half-duplex interlace including frames for a forward link and a reverse link allocated from respective superframes comprising a predetermined odd number of frames;
    means for communicating with the serving base station using frames of the associated half-duplex interlace; and
    means for detecting information transmitted from an asynchronous base station using frames of the associated half-duplex interlace for the forward link, wherein at least two of the plurality of half-duplex interlaces share a common superframe preamble, wherein there is a time interval on the reverse link corresponding to the superframe preamble on the forward link.

37. The apparatus of claim 36, wherein the respective superframes comprise 25 frames.

38. The apparatus of claim 36, wherein the plurality of half-duplex interlaces includes a first half-duplex interlace and a second half-duplex interlace.

39. A non-transitory, computer-readable medium, comprising:
    code for causing a computer to establish communication with a first sector in the wireless communication system;
    code for causing a computer to receive an assignment for a half-duplex interlace for communication with the first sector chosen from a first half-duplex interlace and a second half-duplex interlace, the assigned half-duplex interlace includes frames for a forward link and a reverse link allocated from respective superframes comprising a constant odd number of frames, wherein the first half-duplex interlace and the second half-duplex interlace share a common superframe preamble, wherein there is a time interval on the reverse link corresponding to the superframe preamble on the forward link;
    code for causing a computer to communicate with the first sector using frames of the assigned half-duplex interlace; and
    code for causing a computer to attempt to detect a second sector on the forward link using frames of the associated half-duplex interlace at least in part by searching for one or more acquisition pilots transmitted by the second sector.

40. A processor that executes computer-executable instructions for half-duplex communication in the presence of asynchronous sectors in a wireless communication system, the instructions comprising:
    associating with one or more of a first half-duplex interlace and a second half-duplex interlace for communication with a first sector, the first half-duplex interlace and the second half-duplex interlace contain frames for a forward link and a reverse link provided by a set of superframes divided such that a given frame position in a superframe alternates between forward link communication and reverse link communication for a given half-duplex interlace, wherein the first half-duplex interlace and the second half-duplex interlace share a common superframe preamble, wherein there is a time interval on the reverse link corresponding to the superframe preamble on the forward link;
    communicating with the first sector on one or more of the forward link and the reverse link using frames of the one or more associated half-duplex interlaces; and
    searching for acquisition pilots transmitted by a second sector on the forward link using frames of the one or more associated half-duplex interlaces.

41. The processor of claim 40, wherein superframes in the set of superframes respectively comprise an odd number of frames.

* * * * *